(12) United States Patent
Shimizu et al.

(10) Patent No.: US 9,066,103 B2
(45) Date of Patent: Jun. 23, 2015

(54) VIDEO SIGNAL CODING APPARATUS AND VIDEO SIGNAL CODING METHOD

(75) Inventors: Minako Shimizu, Kyoto (JP); Kenji Iwahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 532 days.

(21) Appl. No.: 13/565,836

(22) Filed: Aug. 3, 2012

(65) Prior Publication Data

US 2012/0300836 A1    Nov. 29, 2012

Related U.S. Application Data

(63) Continuation of application No. PCT/JP2011/000396, filed on Jan. 26, 2011.

(30) Foreign Application Priority Data

Feb. 8, 2010    (JP) .................................. 2010-025742

(51) Int. Cl.
| | |
|---|---|
| *H04N 19/194* | (2014.01) |
| *H04N 19/15* | (2014.01) |
| *H04N 19/115* | (2014.01) |
| *H04N 19/174* | (2014.01) |

(52) U.S. Cl.
CPC ............. *H04N 19/194* (2013.01); *H04N 19/15* (2013.01); *H04N 19/115* (2013.01); *H04N 19/174* (2013.01)

(58) Field of Classification Search
CPC ............................... H04N 19/19; H04N 19/194
See application file for complete search history.

(56) References Cited

U.S. PATENT DOCUMENTS

| | | | | |
|---|---|---|---|---|
| 5,907,362 | A * | 5/1999 | Yamamoto | ............... 375/240.04 |
| 7,839,312 | B2 | 11/2010 | Tanaka et al. | |
| 8,379,728 | B2 * | 2/2013 | Katzur et al. | ............ 375/240.16 |
| 2001/0046263 | A1 * | 11/2001 | Yamada et al. | ........... 375/240.12 |
| 2003/0152224 | A1 * | 8/2003 | Candelore et al. | ............. 380/210 |

(Continued)

FOREIGN PATENT DOCUMENTS

| | | |
|---|---|---|
| JP | 4-266283 | 9/1992 |
| JP | 6-105302 | 4/1994 |

(Continued)

OTHER PUBLICATIONS

International Search Report issued Mar. 1, 2011 in International (PCT) Application No. PCT/JP2011/000396.

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

A video signal coding apparatus includes a coding unit which codes and re-codes a video signal and includes: a coding processing unit which codes, slice-by-slice, a current picture indicated by the video signal, to generate coded data; an integration unit which calculates a code-integrated value indicating a code amount of the coded data; a coding result determination unit which determines that re-coding of the current picture is necessary when determining that the code-integrated value is grater than a threshold; and a re-coding control unit which specifies a slice to be re-coded, based on coding information indicating a feature of the coded data, when it is determined that the re-coding is necessary, and the coding processing unit further re-codes the slice specified by the re-coding control unit.

15 Claims, 13 Drawing Sheets

(56) References Cited

U.S. PATENT DOCUMENTS

| | | | |
|---|---|---|---|
| 2008/0025396 A1* | 1/2008 | Tasaka et al. | 375/240.12 |
| 2009/0207907 A1* | 8/2009 | Sato et al. | 375/240.01 |
| 2010/0007532 A1 | 1/2010 | Tanaka et al. | |
| 2010/0135386 A1* | 6/2010 | Shibata et al. | 375/240.03 |
| 2010/0316130 A1* | 12/2010 | Morimoto et al. | 375/240.24 |
| 2012/0219057 A1* | 8/2012 | Takahashi et al. | 375/240.03 |

FOREIGN PATENT DOCUMENTS

| | | |
|---|---|---|
| JP | 10-304311 | 11/1998 |
| JP | 2004-357079 | 12/2004 |
| WO | 2008/065814 | 6/2008 |

* cited by examiner

FIG. 4

| Size information | Coding scheme information | | Motion vector information | | |
|---|---|---|---|---|---|
| Code amount | Intra-coding count | Inter-coding count | Maximum value | Minimum value | Mean value |
| 311 | 321 | 322 | 331 | 332 | 333 |

310 / 320 / 330 / 300

VIDEO SIGNAL CODING APPARATUS AND VIDEO SIGNAL CODING METHOD

CROSS REFERENCE TO RELATED APPLICATIONS

This is a continuation application of PCT Patent Application No. PCT/JP2011/000396 filed on Jan. 26, 2011, designating the United States of America, which is based on and claims priority of Japanese Patent Application No. 2010-025742 filed on Feb. 8, 2010. The entire disclosures of the above-identified applications, including the specifications, drawings and claims are incorporated herein by reference in their entirety.

TECHNICAL FIELD

The present invention relates to video signal coding apparatuses and methods for coding and transmitting or recording video signals and particularly relates to video signal coding apparatus and method in which video signals are re-coded to generate coded image data which satisfies a target bit rate.

BACKGROUND ART

Recent years have seen a wide spread of moving image capturing devices, still image capturing devices, and moving and still image capturing devices, such as digital video cameras, digital still cameras, camera-equipped mobile phones, surveillance cameras, and on-vehicle cameras.

In these devices having the imaging function, the memory of a recording medium which has limited storage capacity generally becomes full in a short time when data of captured images are directly recorded on the recording medium. Moreover, in the case of directly transmitting data of captured images by way of a transmission path through which data of limited size can be transmitted, it is not possible to transmit the data of captured images in real time. It is therefore common to compress data of captured images in various schemes and then perform other processing on the data reduced in amount when other processing is supposed to be performed on the data.

For example, when the data of captured images are data of moving images, an inter-frame coding scheme is adopted as a compression means. The inter-frame coding scheme is a scheme which is based on the fact that the correlation between one frame and another is strong in video signals.

Among proposed variations of this inter-frame coding scheme, a frequently used one is a transform coding scheme in which a difference between frames in video signals is calculated, and on a difference signal indicating the calculated difference, the orthogonal transform which efficiently uses image correlation within the two-dimensional space is then performed. In particular, a coding scheme based on, as the orthogonal transform, the discrete cosine transform (DCT) has been adopted as a coding scheme of international standards such as ISO/IEC 11172-2 (commonly known as MPEG-1) that is a moving picture coding standard for storage media.

In the inter-frame coding scheme, when a current frame is an inter-frame coded frame, a difference between frames in video signals is calculated, and a value of this difference is transformed into variable-length codes such as Huffman codes.

It is essential that a bit stream (a sequence of compressed codes) generated by performing a coding process on a video stream (image data) can be decoded. It is already known that the decoding process of a bit stream needs to be performed per frame in synchronization with a corresponding video stream and therefore requires a video buffer.

In other words, it is essential that the code amount is controlled (i.e., the rate control is performed) in the coding process so as to avoid overflow and underflow of the video buffer of an assumed device which performs predetermined decoding. For example, as a method of controlling the code amount, a method of a quantization step determination type is used in which an amount of codes being generated is monitored to determine a quantization parameter to be used for coding.

However, even with such per-picture control on a quantization parameter as to avoid overflow and underflow of a video buffer, there is a problem of a failure to prevent overflow of the code amount, for example, for an image which includes fine patterns or a scene with drastic motion such as a scene change.

In this case, the stream following the picture at which the overflow of the code amount occurs cannot be decoded by the assumed decoding device, which means that another control on a quantization parameter and another coding process are required to generate a bit stream which causes no overflow nor underflow of a video buffer in a decoding process.

Re-coding methods have been proposed such as a method of two-pass coding or a method in which coding is stopped at the time of detection of overflow or underflow of a video buffer and then resumes from a point a predetermined period of time ahead of the time of detection (see Patent Literature 1).

CITATION LIST

Patent Literature

[Patent Literature 1] Japanese Unexamined Patent Application Publication No. 10-304311

SUMMARY OF INVENTION

Technical Problem

However, even when the rate control is performed, the above conventional technique still has a problem of large loads on processing time and performance for coding and on required memory space when overflow of the code amount occurs. Specific details are as follows.

First, the two-pass coding requires processing time twice as long as usual because the coding of one picture is repeated twice aiming at the optimum coding. This imposes a problem of an increase in processing time for coding and a problem of an increase in loads on system processing performance and a memory interface.

This means that when overflow of the code amount occurs, there is high possibility that the implementation of re-coding of a picture from which the overflow of the code amount is detected leads to large loads on processing time and performance and required memory space in the system. Thus, there is a problem that the system for coding may be broken, which becomes a cause of a picture skip or a failure in real-time properties.

Furthermore, in an approach such as the technique disclosed by Patent Literature 1 in which coding is stopped at the time of detection of overflow or underflow of a video buffer and then resumes from a point a predetermined period of time back, the coding of a picture will be suspended on the way, which makes it impossible to measure the code amount of entire pictures. Thus, there is a problem that the processing of stopping the coding and resuming the coding from a point a predetermined period of time back is repeated more frequently, resulting in a failure to reduce the processing load.

In addition, since coding of a picture stops at the stage when the coding has not been completed, it is not possible to obtain the coding information following the point in time at which the coding is stopped, which causes a problem of a lack of consideration of image features. Specifically, in the case where whether or not overflow of the code amount occurs is checked in real time in the coding process and at the point in time when overflow of the code amount occurs, the coding is stopped and then resumes from a point a predetermined period of time back, there is a problem of a lack of consideration of video features as pictures.

As above, there is a problem of a failure to prevent overflow of the code amount depending on features of input video signals even when the rate control is performed.

Thus, the present invention has been devised in view of the above-described problems and has an object to provide a video signal coding apparatus and a video signal coding method in which, even when overflow of a code amount occurs, a bit stream adapted to a predetermined rate control can be generated without imposing large loads on processing time and performance for coding and on required memory space.

Solution to Problem

In order to solve the above problems, a video signal coding apparatus according to an aspect of the present invention comprises: an imaging device which generates an electric signal by performing photoelectric conversion of light from a subject; a video signal generation unit configured to generate a video signal by performing predetermined image processing on the electric signal generated by the imaging device; and a coding unit configured to code the video signal, wherein the coding unit includes: a coding processing unit configured to code, slice-by-slice, a current picture indicated by the video signal, to generate coded data; a coding information management unit configured to manage, slice-by-slice, coding information indicating a feature of the coded data; an integration unit configured to integrate per-slice code amounts of the coded data equivalent to one current picture, to calculate a code-integrated value indicating a code amount of the coded data equivalent to one picture; a coding result determination unit configured to determine whether or not the code-integrated value is greater than a predetermined first threshold, and determine that re-coding processing on the current picture is necessary when determining that the code-integrated value is greater than the first threshold; and a re-coding control unit configured to specify a re-coding target slice based on the coding information when the coding result determination unit determines that the re-coding processing is necessary, the re-coding target slice being a target of the re-coding processing, and the coding processing unit is further configured to perform the re-coding processing on the re-coding target slice specified by the re-coding control unit.

Thus, the video signal coding apparatus according to an aspect of the present invention (i) determines per picture whether or not re-coding processing is necessary, and when performing the re-coding processing on the picture on which the re-coding processing is determined to be necessary, (ii) specifies a re-coding target slice using per-slice coding information and (iii) re-codes only the specified slice. By so doing, a bit stream adapted to a predetermined rate control can be generated without imposing large loads on processing time and performance for coding and on required memory space even when overflow of a code amount occurs.

Furthermore, it may be possible that the video signal generation unit is further configured to parse the video signal to generate image feature information indicating a feature of the video signal, and the re-coding control unit is configured to specify the re-coding target slice based on at least one of the coding information and the image feature information when it is determined that the re-coding processing is necessary.

By so doing, the re-coding target slice is specified based on features of input video signals, which makes it possible to specify a more appropriate slice as the re-coding target slice than in the case of specifying the re-coding target slice based on the coding information only.

Furthermore, it may be possible that the re-coding control unit include: a re-coding information generation unit configured to generate re-coding information slice-by-slice based on at least one of the coding information and the image feature information, the re-coding information including priority information indicating a priority of the re-coding processing; a slice specifying unit configured to specify, based on the re-coding information, the re-coding target slice from among one or more slices included in the current picture; and a re-coding request unit configured to control the coding processing unit so that the coding processing unit performs the re-coding processing on the re-coding target slice specified by the slice specifying unit.

By so doing, a priority for performing the re-coding processing is specified per slice, with the result that the re-coding processing can be performed in sequence from a slice with a high priority according to the priority information. For example, on the basis of the coding information and the image feature information, a high priority is assigned to a slice which provides a small impact even under an image condition with a reduced code amount, with the result that image-quality degradation caused by re-coding can be reduced.

Furthermore, it may be possible that the re-coding processing include re-coding of a slice and creation of a dummy for a slice, the re-coding information generation unit be configured to generate the priority information which indicates at least one of a re-coding priority indicating a priority of the re-coding of a slice and a dummy-creation priority indicating a priority of the creation of a dummy for a slice, and the re-coding request unit be configured to control the coding processing unit so that when the re-coding priority of a slice specified by the slice specifying unit is higher than the dummy-creation priority of the slice, the coding processing unit re-codes the slice and when the re-coding priority of the slice is lower than the dummy-creation priority of the slice, the coding processing unit creates a dummy for the slice.

For example, it may be possible that the slice specifying unit be configured to preferentially specify, as the re-coding target slice, a slice ranked high in the re-coding priority or the dummy-creation priority.

By so doing, re-coding or dummy creation of a slice can be selectively performed as the re-coding processing. For example, the dummy creation of a slice allows a significant reduction in coding amount and processing time for re-coding because it is sufficient that information indicating that the re-coding target slice is the same slice as a preceding slice is included in the stream. Furthermore, the re-coding of a slice leads to an increase in quantization width indicated by the quantization parameter, for example, which allows a reduction in code amount and moreover allows an improvement in image quality as compared to the case of the dummy creation.

Furthermore, it may be possible that when the re-coding target slice is re-coded, the re-coding request unit be configured to (i) determine a compression rate of the re-coding target slice such that a difference between the compression rate and a compression rate used to code or re-code a slice adjacent to the re-coding target slice is smaller than or equal to a predetermined second threshold and (ii) control the coding processing unit so that the coding processing unit re-codes the re-coding target slice at the determined compression rate.

By so doing, the occurrence of significant difference in compression rate among the slices can be avoided, which allows a reduction in possibility that a viewer feels per-slice difference caused by re-coding, that is, a reduction in image-quality degradation.

Furthermore, it may be possible that the re-coding request unit be configured to determine the compression rate of the re-coding target slice macroblock-by-macroblock, the macroblock including one or more macroblocks included in the re-coding target slice.

By so doing, the compression rate is determined per small region composed of one macroblock or per middle-size region composed of more than one macroblock, which allows the compression rate to be set for each region, with the result that re-coding can be performed with high accuracy.

Furthermore, it may be possible that the re-coding information generation unit be configured to generate, based on at least one of the coding information and the image feature information, the re-coding information which includes prohibition information indicating whether or not to prohibit the re-coding processing on the one or more slices included in the current picture, and the slice specifying unit be configured to specify the re-coding target slice from among slices of which the re-coding processing is indicated by the prohibition information as not being prohibited.

By so doing, a slice on which the re-coding processing is not to be performed can be set according to prohibition information. For example, it is possible to prohibit re-coding of a slice whose image quality should not be degraded.

Furthermore, it may be possible that the video signal generation unit be configured to parse the video signal to generate, as the image feature information, information indicating at least one of a face region in which an image of a human face is included and a focus region in which a focus is placed in capturing an image, and the re-coding information generation unit be configured to set the prohibition information so as to prohibit the re-coding processing on a slice which includes the face region or the focus region.

By so doing, it is possible to prevent a decrease in code amount of a region to which a viewer is likely to pay attention as image data, such as the focus region, the region in which a human face is included, and the region with drastic motion.

Furthermore, it may be possible that the re-coding control unit further include a re-coding end determination unit configured to determine whether or not a code amount of the current picture after the re-coding processing is greater than the first threshold, and the slice specifying unit be further configured to specify the re-coding target slice from among the one or more slices included in the current picture when the re-coding end determination unit determines that the code amount of the current picture after the re-coding processing is greater than the first threshold.

By so doing, in the case where a bit stream adapted to a predetermined rate control is not generated even after the re-coding processing is performed, it is possible to specify a re-coding target slice again to continue the re-coding processing.

Furthermore, it may be possible that the re-coding end determination unit be configured to determine, every time the re-coding processing on the re-coding target slice specified by the slice specifying unit ends, whether or not the code amount of the current picture after the re-coding processing is greater than the first threshold, and the slice specifying unit be configured to specify the re-coding target slice until the re-coding end determination unit determines that the code amount of the current picture after the re-coding processing is less than the first threshold.

By so doing, the re-coding processing can be repeatedly performed until a bit stream adapted to a predetermined rate control is generated, with the result that a bit stream adapted to a predetermined rate control can be reliably generated.

Furthermore, it may be possible that the re-coding information generation unit be configured to determine whether or not a difference between the code-integrated value and the first threshold is greater than a predetermined third threshold, and generate the re-coding information which, when determining that the difference is greater than the third threshold, indicates a reference image that is generated in coding, and when determining that the difference is smaller than the third threshold, indicates coding input information indicating an input image included in the video signal, and the re-coding request unit be configured to control the coding processing unit so that the coding processing unit selects, as the target of the re-coding processing, an image indicated by the coding input information.

By so doing, in the case where the code amount of coded data generated by coding a current picture is greater than a target code amount, the reference image generated at the time of coding is set as a target for the re-coding processing, which allows a reduction in the code amount generated by the re-coding processing.

Furthermore, it may be possible that the coding information management unit be configured to evaluate the coded data slice-by-slice or macroblock-by-macroblock to generate, slice-by-slice, a slice state management table as the coding information, the macroblock being included in the slice, and the slice state management table indicating a feature of a current slice that is coded and included in the coded data, or a feature of one or more macroblocks included in the current slice.

By so doing, features of the coded data can be obtained in units of macroblocks or slices that are basic units in a coding process, with the result that the re-coding target slice can be specified based on detailed features of the coded data. For example, a motion vector, macroblock information (intra/inter), and so on can be obtained. Thus, since a more appropriate slice can be specified as the re-coding target slice, the re-coding can be performed while the image-quality degradation or the like is prevented.

Furthermore, a video signal coding method according to an aspect of the present invention comprises: coding, slice-by-slice, a current picture indicated by a video signal, to generate coded data; integrating per-slice code amounts of the coded data equivalent to one current picture, to calculate a code-integrated value indicating a code amount of the coded data equivalent to one picture; determining whether or not the code-integrated value is greater than a predetermined threshold, and determining that re-coding processing on the current picture is necessary when determining that the code-integrated value is greater than the threshold; specifying a re-coding target slice based on coding information when it is determined in the determining that the re-coding processing is necessary, the re-coding target slice being a target of the re-coding processing, and the coding information indicating a feature of the coded data; and performing the re-coding processing on the re-coding target slice specified in the specifying.

Advantageous Effects of Invention

According to the present invention, even when overflow of a code amount occurs, a bit stream adapted to a predetermined rate control can be generated without imposing large loads on processing time and performance for coding and on required memory space.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 4 shows an example of a slice state management table according to the embodiment of the present invention;

DESCRIPTION OF EMBODIMENT

The following shall describe an embodiment for implementing the present invention with reference to the drawings.

A video signal coding apparatus according to an embodiment of the present invention includes: a coding processing unit configured to code a current picture to generate coded data; a coding result determination unit configured to determine whether or not a code amount of the coded data is greater than a predetermined threshold, and determine that re-coding processing on the current picture is necessary when determining that the code amount is greater than the threshold; and a re-coding control unit configured to specify a re-coding target slice based on coding information indicating a feature of the coded data when the coding result determination unit determines that the re-coding processing is necessary, and the coding processing unit is configured to perform the re-coding processing on the slice specified by the re-coding control unit.

First, a structure of the video signal coding apparatus according to the embodiment of the present invention is described below.

Figure 1:
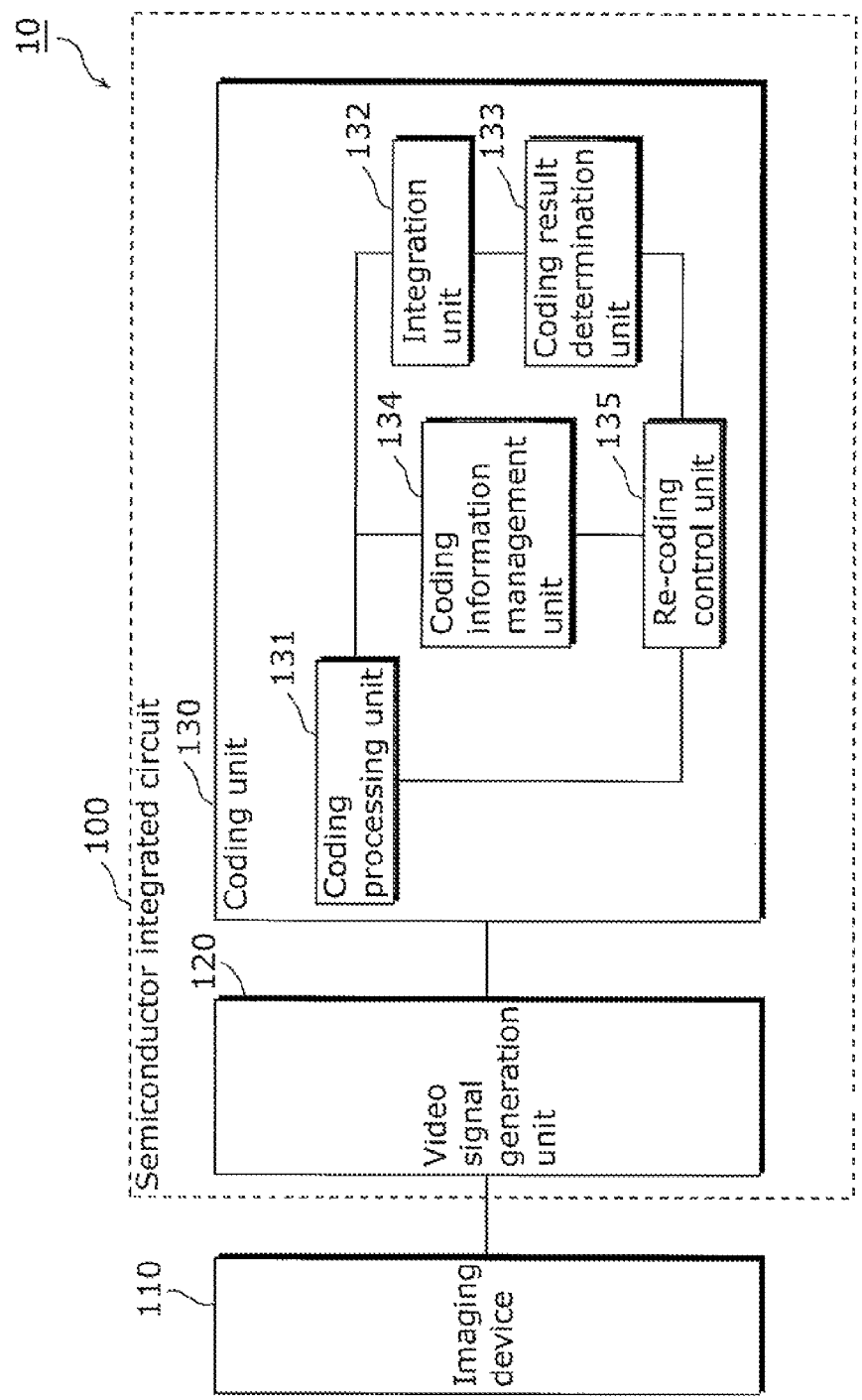
FIG. 1 is a block diagram showing an example of a structure of a video signal coding apparatus according to an embodiment of the present invention.
Figure 2:
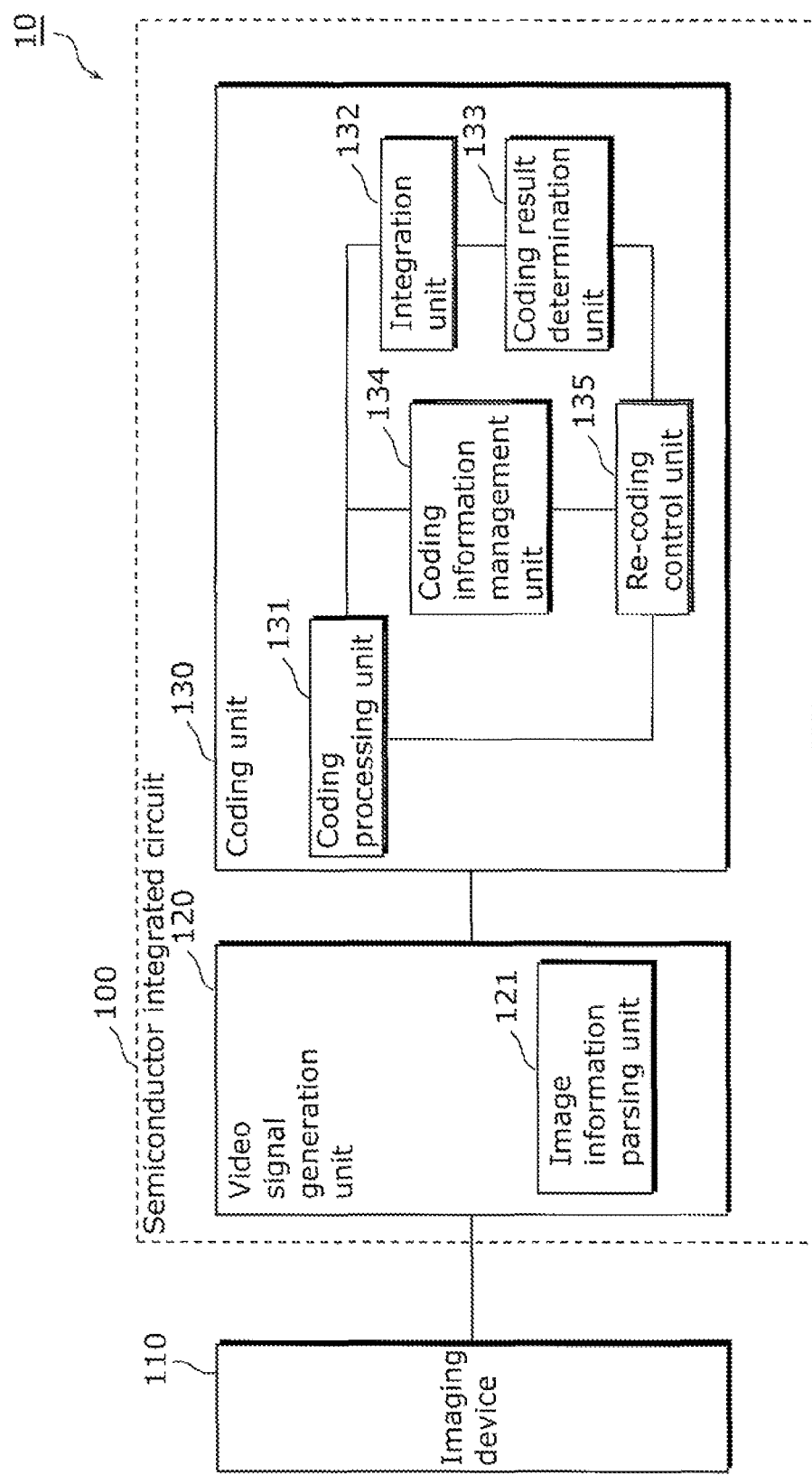
FIG. 2 is a block diagram showing in detail the example of the structure of the video signal coding apparatus according to the embodiment of the present invention.
Figure 3:
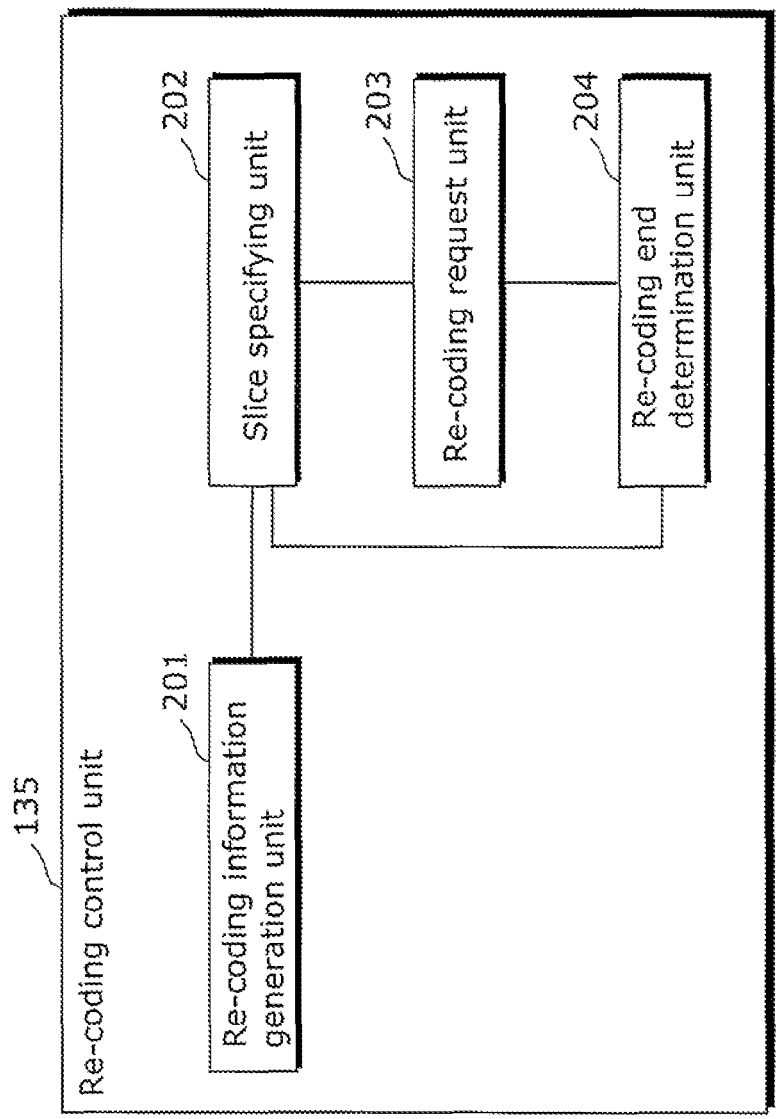
FIG. 3 is a block diagram showing in detail an example of a structure of a re-coding control unit included in the video signal coding apparatus according to the embodiment of the present invention.

FIG. 1 is a block diagram showing an example of a structure of a video signal coding apparatus 10 according to the embodiment of the present invention. FIG. 2 is a block diagram showing in detail the example of the structure of the video signal coding apparatus 10 of FIG. 1. FIG. 3 is a block diagram showing in detail an example of a structure of a re-coding control unit 135 included in the video signal coding apparatus 10 of FIG. 1. With reference to FIGS. 1 to 3, the structure and operation of the video signal coding apparatus 10 according to the embodiment of the present invention are described below.

As shown in FIG. 1, the video signal coding apparatus 10 includes a semiconductor integrated circuit 100 and an imaging device 110.

The imaging device 110 generates an electric signal by performing photoelectric conversion of light from a subject. Specifically, the imaging device 110 converts, into an electric signal, video light entered through an optical system (not shown) such as a lens. The imaging device 110 is, for example, an imaging sensor such as a charge coupled device (CCD) sensor or a complementary metal oxide semiconductor (CMOS) sensor.

The semiconductor integrated circuit 100 is an integrated circuit (IC) or other integrated circuits of large scale integration (LSI) type and so on and includes a video signal generation unit 120 and a coding unit 130. In addition, the semiconductor integrated circuit 100 may include an internal memory such as a dynamic random access memory (DRAM) and a static random access memory (SRAM).

The video signal generation unit 120 generates a video signal by performing, on the electric signal read from the imaging device 110, a predetermined image process such as automatic exposure (AE) processing, white balance (WB) processing, aperture processing, and luminance and chrominance (YC) processing. The video signal includes a luminance signal and a chrominance signal.

The coding unit 130 performs coding processing and re-coding processing on a video signal. Specifically, the coding unit 130 generates a bit stream by performing a coding process and, when needed, re-coding processing, on an input signal that includes a luminance signal and a chrominance signal. The coding unit 130 includes, as shown in FIG. 1, a coding processing unit 131, an integration unit 132, a coding result determination unit 133, a coding information management unit 134, and a re-coding control unit 135.

The coding processing unit 131 codes, slice-by-slice, a current picture indicated by a video signal, to generate coded data. Specifically, the coding processing unit 131 generates the coded data by coding the luminance signal and the chrominance signal at a predetermined compression rate adapted to a rate control. It is to be noted that the coded data indicates one-picture-equivalent coded data generated by coding the current picture.

More specifically, the coding processing unit 131 codes the current picture per macroblock included in a slice. For example, the coding processing unit 131 calculates a difference between a current macroblock and a predicted image generated by intra prediction or inter prediction. The coding processing unit 131 then performs orthogonal transform, quantization, and entropy coding on the calculated difference. A code amount of the coded data generated by the coding processing unit 131 depends on a quantization parameter that is used for the quantization.

The integration unit 132 calculates a code-integrated value indicating a code amount of the coded data by integrating per-slice code amounts of the coded data. The code-integrated value calculated here is code amounts of one-picture-equivalent data resulting from coding of the current picture.

The coding result determination unit 133 determines whether or not the code-integrated value is greater than the first threshold, and when it is determined that the code-integrated value is greater than the first threshold, the coding result determination unit 133 determines that re-coding processing on the current picture is necessary. In short, the coding result determination unit 133 determines, based on the code-integrated value, whether or not there is overflow of the code amount in the current picture. In this way, the coding result determination unit 133 determines whether or not the re-coding processing is necessary.

The coding information management unit 134 manages, slice-by-slice, coding information indicating a feature of the coded data. Specifically, the coding information management unit 134 evaluates the macroblock-by-macroblock coded data provided from the coding processing unit 131, to generate a slice state management table indicating slice state information. A specific example of the slice state management table will be described later.

When the coding result determination unit 133 determines that the re-coding is necessary, the re-coding control unit 135 specifies, based on the coding information, a re-coding target slice that becomes a target of the re-coding processing. Specifically, the re-coding control unit 135 specifies the re-coding target slice from among a plurality of slices included in the current picture and outputs, to the coding processing unit 131, a re-coding request which requests re-coding of the specified re-coding target slice. The re-coding request includes, for example, information with which the re-coding target slice can be specified When receiving the re-coding request, the coding processing unit 131 performs the re-coding processing on the re-coding target slice specified based on the re-coding request.

As described above, the video signal coding apparatus 10 according to the embodiment of the present invention re-codes the current picture when the code amount of the coded data generated by coding the current picture is grater than a predetermined threshold. At this time, the video signal coding apparatus 10 specifies, based on the coding information indicating a feature of the coded data, a re-coding target slice from among the plurality of slices included in the current picture and re-codes the specified slice only.

Furthermore, as shown in FIG. 2, the video signal generation unit 120 may include an image information parsing unit 121.

The image information parsing unit 121 parses an input video signal to generate image feature information included in the video signal. The image feature information includes, for example, information indicating a face region in which an image of a human face is included in an image region obtained by capturing an image, information indicating a focus region in which a focus is placed in capturing an image, or information on an image frequency. The generated image feature information is output to the re-coding control unit 135 of the coding unit 130.

When the coding result determination unit 133 determines that the re-coding processing is necessary, the re-coding control unit 135 specifies a re-coding target slice based on at least one of the coding information managed by the coding information management unit 134 and the image feature information generated by the image parsing unit 121.

Specifically, as shown in FIG. 3, the re-coding control unit 135 includes a re-coding information generation unit 201, a slice specifying unit 202, a re-coding request unit 203, and a re-coding end determination unit 204.

The re-coding information generation unit 201 generates re-coding information based on the slice state management table and the image feature information. The re-coding information is information generated per slice included in the current picture and includes, for example, priority information indicating a priority of the re-coding processing such as re-coding or dummy creation.

Specifically, the re-coding information generation unit 201 determines, per slice included in the current picture, the appropriateness of the re-coding processing on the slice, to thereby determine an execution priority for the re-coding processing on the slice. For example, the re-coding processing includes re-coding of a slice and dummy creation of a slice, and the execution priority is a re-coding priority and a dummy-creation priority.

An operation of the re-coding information generation unit 201 and a detail of the re-coding information will be described later.

The slice specifying unit 202 specifies, based on the re-coding information, a re-coding target slice from among one or more slices included in the current picture. Specifically, the slice specifying unit 202 specifies a re-coding target slice based on, for example, the priority determined by the re-coding information generation unit 201.

The re-coding request unit 203 controls the coding processing unit 131 so that the coding processing unit 131 performs the re-coding processing on the re-coding target slice specified by the slice specifying unit 202. Specifically, the re-coding request unit 203 outputs the re-coding request to the coding processing unit 131, thereby controlling the coding processing unit 131.

The re-coding end determination unit 204 determines whether or not the code amount of the current picture after the re-coding processing is greater than the first threshold. The determination result is output to the slice specifying unit 202, and when the re-coding end determination unit 204 determines that the code amount of the current picture after the re-coding processing is greater than the first threshold, the slice specifying unit 202 newly specifies a re-coding target slice from among the one or more slices included in the current picture.

For example, the re-coding end determination unit 204 determines whether or not the code amount of the current picture after the re-coding processing is greater than the first threshold every time the re-coding processing on a re-coding target slice ends. Until the re-coding end determination unit 204 determines that the code amount of the re-coding target slice after the re-coding processing is less than the first threshold, the slice specifying unit 202 specifies a re-coding target slice.

In other words, the re-coding end determination unit 204 evaluates whether or not a new coded picture formed using a slice on which the re-coding processing has been performed will form a bit stream which is adapted to a predetermined rate control, and when the new coded picture satisfies the conditions required for the bit stream, then the re-coding end determination unit 204 causes the re-coding processing to end. When the new coded picture fails to satisfy the required conditions, the re-coding end determination unit 204 causes the slice specifying unit 202 to specify a next re-coding target slice.

As described in the above structure, when re-coding the current picture, the video signal coding apparatus 10 according to the embodiment of the present invention specifies a re-coding target slice from among the one or more slices included in the current picture and performs the re-coding processing on the specified re-coding target slice. Until the coded picture after the re-coding processing forms the bit stream which is adapted to the predetermined rate control, the video signal coding apparatus 10 repeatedly specifies a re-coding target slice and performs the re-coding processing thereon.

This makes it possible to generate a bit stream which is adapted to a predetermined rate control even when overflow of a code amount occurs in coding of the current picture. Furthermore, the current picture is re-coded slice-by-slice in this case, which allows a reduction in the large loads which may be imposed on processing time and performance for re-coding and on required memory space.

Here, with reference to FIG. 4, the slice state management table which the coding information management unit 134 generates is described. FIG. 4 shows an example of the slice state management table according to the embodiment of the present invention.

As described above, the coding information management unit 134 generates a slice state management table 300 per slice by evaluating, slice-by-slice or macroblock-by-macroblock, the coded data generated by coding the current picture. Specifically, the coding information management unit 134 evaluates the macroblock-by-macroblock coded data to generate the slice state management table 300 indicating the slice state information.

The slice state information indicates a feature of a current slice and a feature of one or more macroblocks included in the current slice. Specifically, the slice state information includes size information 310, coding scheme information 320, and motion vector information 330 as shown in FIG. 4.

The slice state management table 300 indicates, for example, the size information 310, the coding scheme information 320, and the motion vector information 330.

The size information 310 indicates a code amount 311 of the current slice.

The coding scheme information 320 indicates an intra-coding count 321 and an inter-coding count 322. The intra-coding count 321 indicates the number of macroblocks coded in the intra-coding scheme among a plurality of macroblocks included in the current slice. The inter-coding count 322 indicates the number of macroblocks coded in the inter-coding scheme among the macroblocks included in the current slice.

The motion vector information 330 indicates a maximum value 331, a minimum value 332, and a mean value 333, of the motion vectors. The maximum value 331 of the motion vectors indicates the maximum value of the motion vector generated for each of the macroblocks included in the current slice. The minimum value 332 of the motion vectors indicates the minimum value of the motion vector generated for each of the macroblocks included in the current slice. The mean value 333 of the motion vectors indicates the mean value of the motion vector generated for each of the macroblocks included in the current slice.

It is to be noted that FIG. 4 shows an example of the slice state management table which the coding information management unit 134 generates, and therefore information other than the above may be managed inside the slice state management table 300 as long as the information can be used to collect, slice-by-slice and/or macroblock-by-macroblock, the results obtained by coding the current picture. For example, the number of macroblocks which have motion vectors greater than a predetermined value may be managed.

Figure 5:
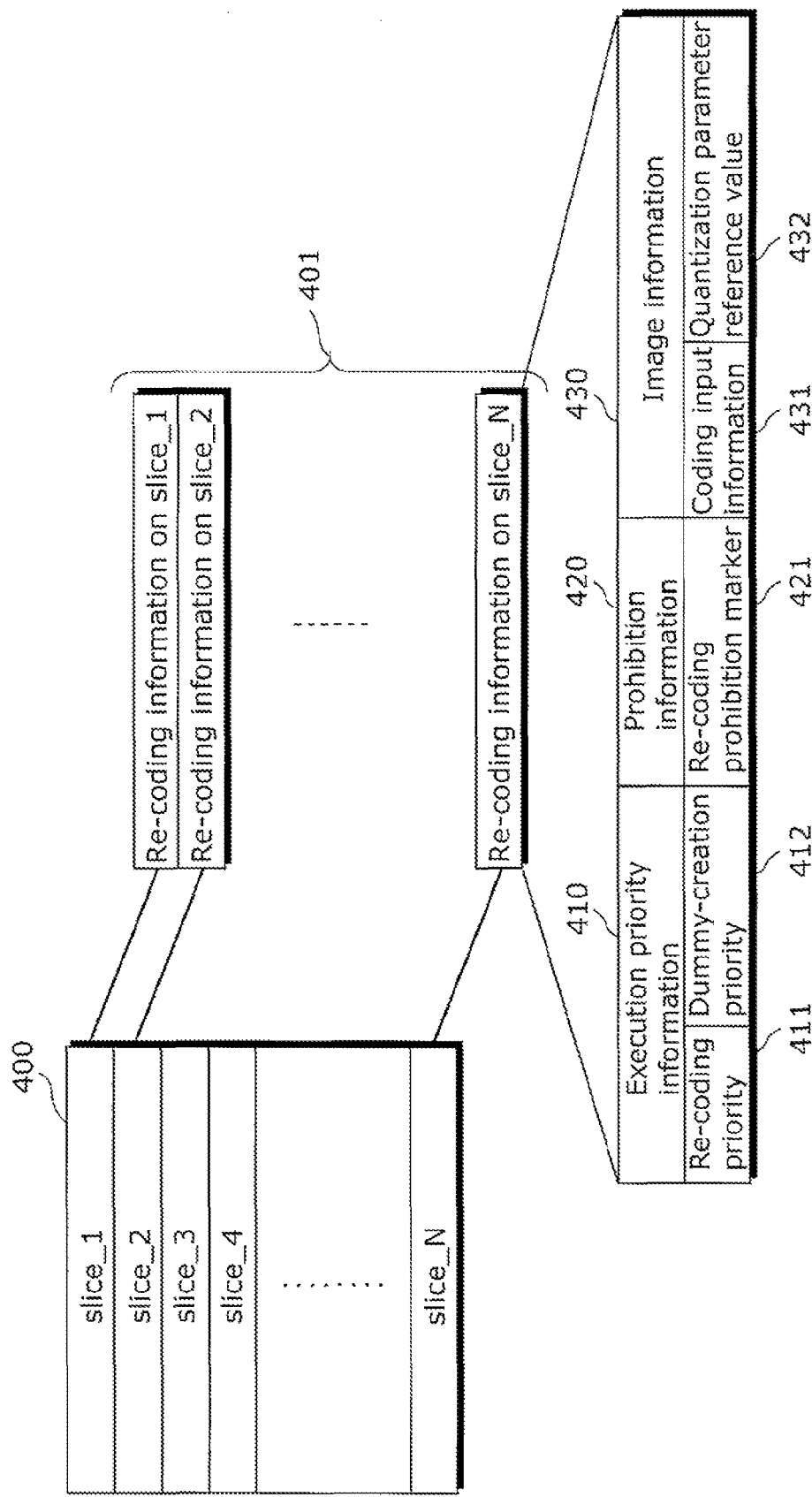
FIG. 5 shows an example of re-coding information according to the embodiment of the present invention.

Next, with reference to FIG. 5, the re-coding information which the re-coding information generation unit 201 generates is described. FIG. 5 shows an example of the re-coding information according to the embodiment of the present invention.

In FIG. 5, a current picture 400 includes, for example, N slices where N is a given natural number. In order to differentiate the N slices from one another, the respective N slices are denoted by slice_1 to slice_N.

Since the re-coding information is generated per slice included in a picture, re-coding information for slice_1 to re-coding information for slice_N that correspond to the respective slice_1 to slice_N are generated.

These pieces of the re-coding information may be managed separately or may be managed, as shown in FIG. 5, collectively as a re-coding information table 401. Furthermore, the re-coding information or the re-coding information table 401 can be managed in a memory when an external memory such as a secure digital (SD) card or an internal memory such as DRAM and SRAM is provided.

The re-coding information includes execution priority information 410, prohibition information 420, and image information 430.

The execution priority information 410 is information indicating a priority of predetermined processing to be performed on the current slice in the case of performing the re-coding processing on the current picture. Specifically, the execution priority information 410 indicates a re-coding priority 411 and a dummy-creation priority 412.

The re-coding priority 411 is information indicating a priority of re-coding of the current slice in the case of performing the re-coding processing on the current picture and is used to determine a rank of each slice in the order of re-coding. Specifically, the slice specifying unit 202 specifies, as a slice to be re-coded, a slice in descending order of the re-coding priority 411. By so doing, the coding processing unit 131 performs the re-coding processing preferentially on a slice ranked high in the re-coding priority 411.

The dummy-creation priority 422 is information indicating a priority of dummy creation of the current slice in the case of performing the re-coding processing on the current picture and is used to determine a rank of each slice in the order of dummy creation. The dummy creation is to replace the current slice with a dummy slice at the time of re-coding. In other words, the current slice is treated as information completely the same as a co-located slice of a preceding picture that is temporally continuous with the current slice. Specifically, the slice specifying unit 202 specifies, as a slice for which a dummy slice is to be created, a slice in descending order of the dummy-creation priority 412. By so doing, the coding processing unit 131 performs the dummy creation preferentially on a slice ranked high in the dummy-creation priority 412.

The prohibition information 420 is information indicating whether or not the re-coding processing on a slice included in the current picture is prohibited, and when the re-coding processing is prohibited, a re-coding prohibition marker 421 is set.

The re-coding prohibition marker 421 indicates that the re-coding processing on the current slice is prohibited when the re-coding processing is performed on the current picture. This means that the re-coding prohibition marker 421 is set in the case where a reduction in the amount of information of the current slice is undesirable such as the case where the current slice includes an important image (for example, an image of the face of a subject).

As a result, the slice for which the re-coding prohibition marker 421 has been set is not re-coded and therefore maintains a high code amount. Even in this case, re-coding of the other slices makes it possible to code the current picture into data which satisfies a target bit rate.

The image information 430 indicates coding input information 431 and a quantization parameter reference value 432.

The coding input information 431 is flag information for determining which data is to be used as YC data that is to be input to the coding processing unit 131 at the time of re-coding the current slice. As the YC data, normal YC (image information (luminance information and chrominance information) generated by the video signal generation unit 120) or reference YC (image information (luminance information and chrominance information) generated at the time of coding the current picture in the coding processing unit 131) can be selected.

It is to be noted that since the reference YC has a code amount smaller than the code amount of the normal YC, it is effective to use the reference YC in reducing the code amount in the re-coding. In addition, for example, when the YC data has been stored in an internal memory area such as DRAM, the coding input information 431 may be input area information indicating, for example, spatial address information in the internal memory area, instead of the flag information indicating which one of the normal YC and the reference YC is to be used as an input.

The quantization parameter reference value 432 indicates a quantization parameter value which is used as a reference in the case of re-coding the current slice. For example, for the quantization parameter reference value 432, a quantization parameter value is set which indicates a quantization width greater than the quantization width indicated by the quantization parameter used for the coding. With this, the re-coding allows a reduction in the code amount of the current slice.

It is to be noted that the above information is an example and may be any information as long as the information is generated with reference to the slice state management table 300 generated by the coding information management unit 134 and the image feature information generated by the image information parsing unit 121.

The following describes an operation related to the re-coding processing among the operations of the video signal coding apparatus 10 according to the embodiment of the present invention. The operation of coding a video signal is the same or alike as that in a conventional technique and therefore will not be described below.

Figure 6:
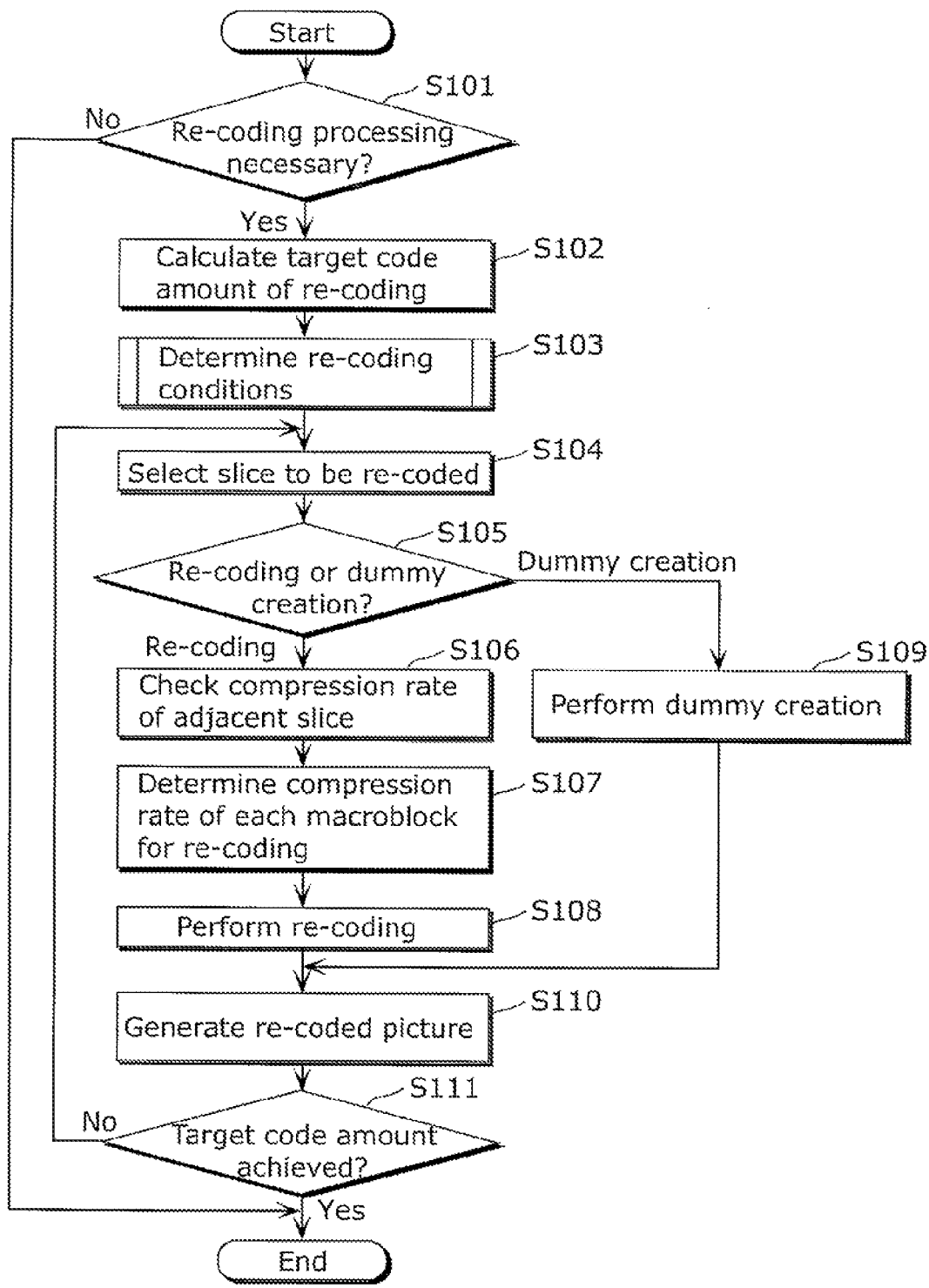
FIG. 6 is a flowchart showing an example of re-coding among operations of the video signal coding apparatus according to the embodiment of the present invention.

FIG. 6 is a flowchart showing an example of processing related to the re-coding processing among the operations of the video signal coding apparatus 10 according to the embodiment of the present invention.

The processing related to the re-coding processing is started when the coding processing unit 131 completes the coding of the video signals for one picture (the current picture) and thus the coded data is generated. At this time, as described above, the coding information management unit 134 generates, per slice included in the current picture, the slice state management table 300 as shown in FIG. 4 and holds the generated slice state management table 300 in a memory or the like.

First, the coding result determination unit 133 determines whether or not the re-coding processing on the current picture is necessary (S101). Specifically, first, the integration unit 132 calculates the code-integrated value by integrating the per-slice code amounts. The coding result determination unit 133 then determines whether or not the code-integrated value is greater than the predetermined threshold, and when it is determined that the code-integrated value is greater than the threshold, the coding result determination unit 133 determines that the re-coding processing on the current picture is necessary.

In other words, the coding result determination unit 133 determines whether or not the current picture is a picture having a problem of code-amount overflow or the like, to thereby determine whether or not the re-coding processing is to be performed on the current picture. For example, when it is determined that the code-integrated value is greater than the threshold and there is overflow of the code amount, a normal stream cannot be formed with the coded data generated by coding the current picture. The coding result determination unit 133 therefore determines that the current picture is a picture which requires the re-coding processing.

When the coding result determination unit 133 determines that the re-coding processing is not necessary (No in S101), the re-coding control unit 135 causes the coding processing unit 131 to code a next picture as the current picture.

When the coding result determination unit 133 determines that the re-coding processing is necessary (Yes in S101), the coding result determination unit 133 calculates a target code amount of the re-coding based on a code amount of a coding result and an achievement code amount (S102).

The code amount of the coding result indicates an actual code amount, that is, a code-integrated value, of the coded data generated by coding the current picture. The achievement code amount indicates a target code amount that is to be achieved by the coded data generated by coding the current picture. This means that the code-integrated value is desirably smaller than or equal to the achievement code amount. The target code amount of the re-coding indicates a target code amount that is to be achieved by the coded data generated by re-coding the current picture.

Next, the re-coding information generation unit 201 determines re-coding conditions for each of the slices included in the current picture (S103). For example, for each of the slices included in the current picture, the re-coding information generation unit 201 evaluates the coded data to generate the re-coding information. The re-coding information is information indicating, as shown in FIG. 5, conditions for re-coding the current slice. The re-coding information generation unit 201 generates the re-coding information slice-by-slice to thereby generate, for example, the re-coding information table 401 as shown in FIG. 5.

For example, the re-coding information generation unit 201 determines the re-coding priority and the dummy-creation priority and the quantization parameter reference value and the like which are used at the time of re-coding, to thereby generate the re-coding information. Furthermore, at this time, the re-coding information generation unit 201 evaluates the state of the current slice and when the current slice satisfies particular conditions, the re-coding information generation unit 201 may determine that the current slice is not to be re-coded. Specifically, the re-coding information generation unit 201 may include the prohibition information 420 in the re-coding information as shown in FIG. 5. It is to be noted that the re-coding information is information which can be referred to in succeeding processing.

The slice specifying unit 202 evaluates the re-coding information of each of the N slices and selects, from among the N slices, a specific slice on which the re-coding processing is to be performed (hereinafter referred to as re-coding target slice) (S104). It is to be noted that a slice ranked high in the execution priority in the re-coding information is preferentially selected as the re-coding target slice. For example, the slice specifying unit 202 preferentially specifies, as the re-coding target slice, a slice ranked high in the re-coding priority or the dummy-creation priority.

Furthermore, the slice specifying unit 202 determines, based on the re-coding information, how the selected re-coding target slice is to be treated (S105). For example, the slice specifying unit 202 determines whether, as the re-coding processing, the re-coding target slice is to be re-coded or a dummy for the re-coding target slice is to be created. Specifically, on the basis of the re-coding priority 411 and the dummy-creation priority 412, it is determined whether the re-coding target slice is a slice which is to be re-coded to generate coded data again or is a slice for which a dummy slice is to be created.

For example, in the case where the re-coding priority 411 of the selected re-coding target slice has been set, the slice specifying unit 202 treats that slice as the slice which is to be re-coded. In the case where the dummy-creation priority 412 of the selected re-coding target slice has been set, the slice specifying unit 202 treats that slice as the slice for which a dummy slice is to be created. In the case where both the re-coding priority 411 and the dummy-creation priority 412 have been set for the selected re-coding target slice, these priorities are compared to select an approach with a higher priority, and a method of re-coding is thus determined.

When the slice specifying unit 202 determines that the re-coding target slice is to be re-coded ("Re-coding" in S105), the re-coding request unit 203 checks a compression rate of a slice adjacent to the re-coding target slice (S106). Specifically, the re-coding request unit 203 executes a checking process of a quantization parameter value of an adjacent slice (hereinafter referred to as adjacent slice coding information).

The re-coding request unit 203 determines a compression rate for re-coding of the re-coding target slice, specifically, a quantization parameter value, in view of the quantization parameter reference value 432 indicated in the re-coding information and the adjacent slice coding information (S107). The re-coding request unit 203 then notifies the coding processing unit 131 of, as the re-coding request, the information for specifying a re-coding target slice, the information indicating that the re-coding has been selected, and the quantization parameter value.

It is to be noted that the re-coding request unit 203 is capable of determining the quantization parameter value per macroblock included in the re-coding target slice or per middle-size region composed of such macroblocks.

The coding processing unit 131 performs re-coding of the re-coding target slice (S108). Specifically, the coding processing unit 131 re-codes the re-coding target slice using the quantization parameter value determined by the re-coding request unit 203, to generate a new slice (hereinafter referred to re-coding result slice) to replace the re-coding target slice.

Although the quantization parameter value is used as the information which indicates the compression rate of coding in the above description, information which the re-coding request unit 203 determines is not necessarily limited to the quantization parameter value as long as the compression rate for re-coding can be defined using the information.

When the slice specifying unit 202 determines that a dummy for the re-coding target slice is to be created ("Dummy creation" in S105), the coding processing unit 131 performs dummy creation (S109). Specifically, the re-coding request unit 203 notifies the coding processing unit 131 of, as the re-coding request, the information for specifying a re-coding target slice and the information indicating that the dummy creation has been selected. The coding processing unit 131 then performs processing of replacing the re-coding target slice with a dummy slice to thereby generate a re-coding result slice to replace the re-coding target slice.

The coding processing unit 131 generates a re-coded picture using the re-coding result slice generated by the re-coding or the dummy creation (S110).

The re-coding end determination unit 204 determines whether or not the code amount of the re-coded picture has achieved the target code amount (S111). In other words, the re-coding end determination unit 204 evaluates the code amount of the re-coded picture and the target code amount of the re-coding.

When the code amount of the re-coded picture has not achieved the target code amount (No in S111), the slice specifying unit 202 specifies a new re-coding target slice (back to S104). In this way, the re-coding of a slice is repeated until the code amount of a re-coded picture achieves the target code amount.

When the code amount of the re-coded picture has achieved the target code amount of the re-coding (Yes in S111), the re-coding processing ends.

As described in the above operation, the video signal coding apparatus 10 according to this embodiment determines re-coding of the current picture and re-codes the current picture slice-by-slice when the code amount of the coded data generated by coding the current picture is greater than a predetermined threshold.

By so doing, not the entire current picture is re-coded, with the result that a bit stream adapted to a predetermined rate control can be generated without imposing large loads on processing time and performance for coding and on memory space required for the re-coding processing.

Figure 7:
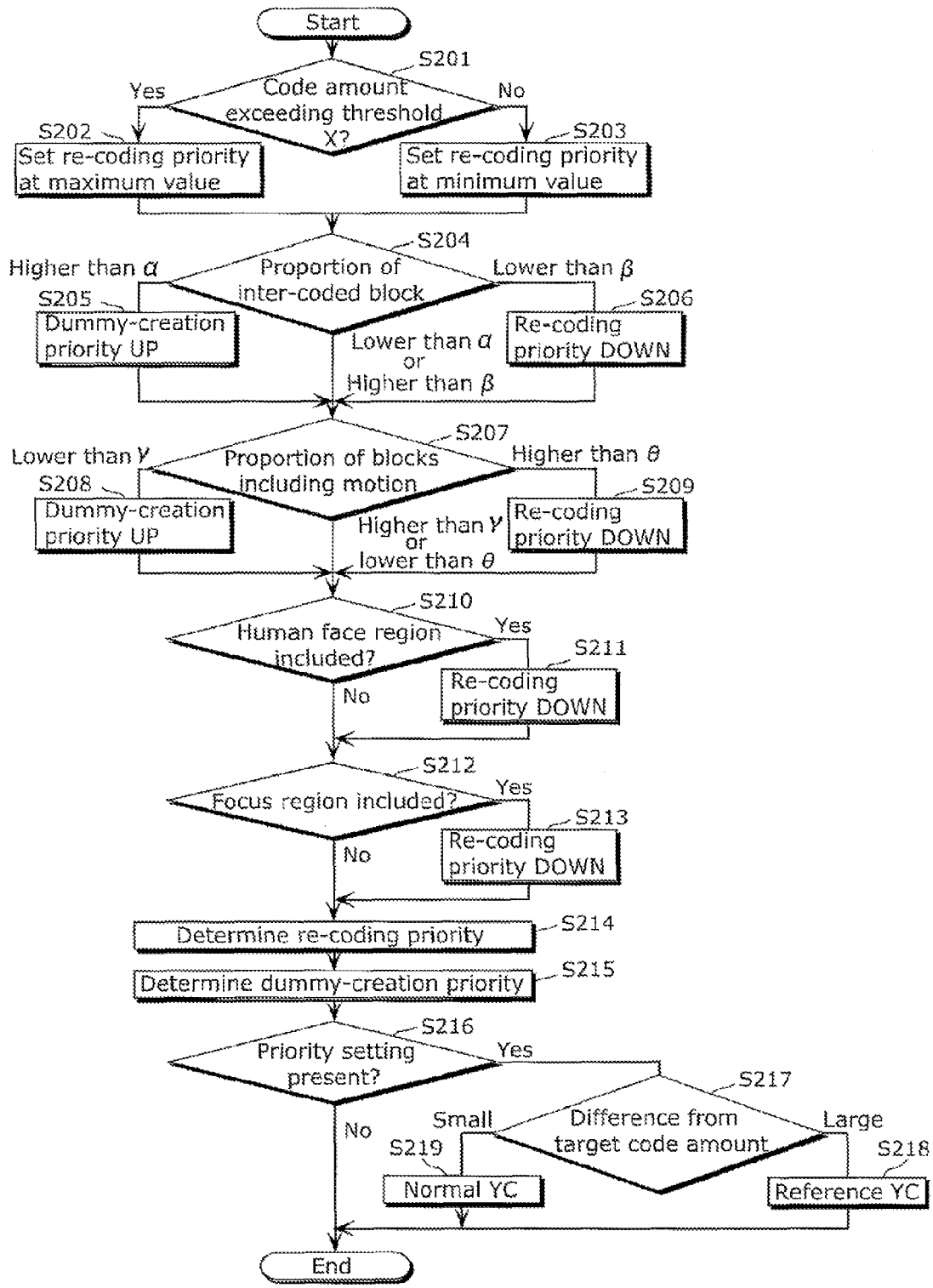
FIG. 7 is a flowchart showing an example of an operation of determining re-coding conditions for a slice among operations of the re-coding control unit according to the embodiment of the present invention.

Next, a more detailed operation of determining re-coding conditions is described. Specifically, for the N slices included in the current picture, the operation of determining an execution priority in re-coding of each slice and the operation of determining a coding method for re-coding are described with reference to FIG. 7. FIG. 7 is a flowchart showing an example of the operation of determining re-coding conditions for a slice among operations of the re-coding control unit 135 according to the embodiment of the present invention.

In the following description, it is assumed that the current picture includes N slices where N is a given natural number. The current slice whose slice state is evaluated is assumed to be the A-th slice in the current picture and is referred to as A slice where A is a natural number smaller than or equal to N. All the slices included in the picture are referred to as entire slices. The picture for which it is determined that the re-coding is necessary is referred to as a re-coding target picture.

First, the re-coding information generation unit 201 evaluates whether or not the code amount of the A slice exceeds a predetermined threshold X (S201). The threshold X is, for example, calculated from the mean value of achievement code amounts, the mean value of coding result code amounts, or a difference between these mean values.

The mean value of achievement code amounts is a per-slice mean value of code amounts that should not be exceeded in the coded data generated by coding the current picture. The mean value of coding result code amounts is a per-slice mean value of actual code amounts in the coded data generated by coding the current picture.

When the code amount of the A slice exceeds the threshold X (Yes in S201), the re-coding information generation unit 201 sets the re-coding priority of the A slice at the maximum value (S202). When the code amount of the A slice does not exceed the threshold X (No in S201), the re-coding information generation unit 201 sets the re-coding priority at the minimum value (S203).

For example, the re-coding priority is represented by numeric values of 1 to 3 where 3 is a given natural number. For example, in the case where the re-coding priority of the A slice is set at 3, the re-coding priority of the A slice is the maximum value, which means that the A slice is set as a slice which is to be preferentially re-coded among the slices of 1 to N. In short, the re-coding priority with a larger value indicates a higher priority, that is, being most likely to be selected as the re-coding target slice.

Next, the re-coding information generation unit 201 evaluates the number of inter-coded macroblocks (the inter-coding count 322) and the number of intra-coded macroblocks (the intra-coding count 321) among one or more macroblocks included in the A slice (S204). Specifically, the re-coding information generation unit 201 determines a proportion, in the A slice, of the macroblocks coded in each coding scheme. The fact that there are a large number of inter-coded blocks shows that the A slice is little different from a preceding slice, adopts a lot of preceding information, and has a strong correlation with a preceding slice. The fact that there are a large number of intra-coded blocks shows that the A slice is very different from a preceding slice, adopts preceding information in a small proportion, and has a weak correlation with a preceding slice. In other words, it can be conceived that when there are a large number of intra-coded blocks, the dummy creation should be avoided and when there are a large number of inter-coded blocks, preferential dummy creation can increase the effect of reducing the code amount.

For example, when the proportion of the inter-coded macroblocks in the A slice is higher than $\alpha$ ("Higher than $\alpha$" in S204), the re-coding information generation unit 201 determines that the A slice is a slice which is little different from a preceding slice, and sets the dummy-creation priority high since it can be conceived that a visual impact caused by dealing with a dummy slice for the A slice is small. When the proportion of the inter-coded macroblocks in the A slice is lower than $\beta$ ("Lower than $\beta$" in S204), the re-coding information generation unit 201 determines that the A slice is a slice which has a weak correlation with a preceding slice, that is, determines that the A slice is a slice of which re-coding to reduce the code amount is highly likely to cause image-quality degradation and is highly likely to have an adverse visual impact, and sets the re-coding priority low.

The thresholds denoted by $\alpha$ and $\beta$ here may be set at any values depending on a system environment. For example, when $\alpha$ is smaller than $\beta$, the proportion of the inter-coded blocks is higher than $\alpha$ and lower than $\beta$, the re-coding information generation unit 201 sets the dummy-creation priority high and the re-coding priority low.

For example, when $\alpha$ is set at 80%, a dummy is created for a slice which has 80% or more of the inter-coded macroblocks, with the result that the effect of reducing the code amount can be improved. Although the above description shows the case of evaluating a proportion of the inter-coded macroblocks, the conditions may be determined according to a proportion of the intra-coded macroblocks or a relationship between the proportion of the inter-coded macroblocks and the proportion of the intra-coded macroblocks.

After a priority is set according to the proportion of the inter-coded macroblocks or when the proportion of the inter-coded macroblocks is lower than $\alpha$ or higher than $\beta$, the re-coding information generation unit 201 evaluates a proportion of macroblocks which include motion (S207). Specifically, the re-coding information generation unit 201 evaluates motion vector quantity in the macroblocks included in the A slice, to determine whether or not the slice is a slice which includes motion.

The fact that the proportion of the macroblocks having motion vector quantity in the A slice is high shows that the A slice is a slice which includes drastic motion. The fact that the proportion of the macroblocks having motion vector quantity in the A slice is low shows that the A slice is a slice which includes little motion. A reduction in the code amount by re-coding the slice which includes drastic motion will result in a reduction in the code amount for representing motion and therefore make it highly likely to produce an image with intense noise. For a slice which includes little motion, a frame the same as a preceding frame is used (dummy creation) to reduce the code amount, which provides a small impact.

In view of the above, the re-coding information generation unit 201 sets the dummy-creation priority high (S208) when the proportion of the macroblocks having motion vector quantity in the A slice is lower than $\gamma$ ("Lower than $\gamma$" in S207). When the proportion of the macroblocks having motion vector quantity in the A slice is higher than $\theta$ ("Higher than $\theta$" in S207), the re-coding information generation unit 201 sets the re-coding priority low. By so doing, for a slice with drastic motion, a reduction in the code amount can be prevented, and for a slice with little motion, an effect of reducing the code amount can be produced.

It is assumed that $\gamma$ and $\theta$ used as thresholds can be set at given values depending on a system. For example, when the proportion of the macroblocks having motion vector quantity in the A slice is lower than $\gamma$ and higher than $\theta$ in the case where $\gamma$ is higher than $\theta$, the re-coding information generation unit 201 sets the dummy-creation priority low and the re-coding priority high. In addition, although the evaluation on the presence of motion vector quantity has been described herein, a direction of a motion vector may also be evaluated.

After a priority is set according to the proportion of the macroblocks including motion or when the proportion of the macroblocks including motion is higher than $\gamma$ or lower than $\theta$, the re-coding information generation unit 201 determines whether or not the A slice includes a human face region (S210). Specifically, on the basis of the image feature information generated by the image information parsing unit 121, the re-coding information generation unit 201 evaluates whether or not the A slice includes a human face region.

Usually, a human face is a region to which a photographer is likely to pay attention upon capturing an image. The region is therefore considered to be where a reduction in the code amount by re-coding to reduce the amount of information is desired to be avoided.

Accordingly, when it is determined that the A slice includes a human face region (Yes in S210), the re-coding information generation unit 201 sets the re-coding priority low (S211). By so doing, the possibility that the A slice which includes a face region is re-coded can be set low. In addition, in the case where it is desired that a slice including a face region must not be re-coded, the re-coding information generation unit 201 is capable of setting a re-coding prohibition marker by which the target slice will not be re-coded.

Next, the re-coding information generation unit 201 determines whether or not the A slice includes a focus region (S212). Usually, the focus region is a region to which a photographer pays attention upon capturing an image. The region is therefore considered to be where a reduction in the code amount by re-coding to reduce the amount of information is desired to be avoided.

Accordingly, when it is determined that the A slice includes a focus region (Yes in S212), the re-coding information generation unit 201 sets the re-coding priority low (S213). By so doing, the possibility that the A slice which includes a focus region is re-coded can be set low. In addition, in the case where it is desired that a slice including a focus region must not be re-coded, the re-coding information generation unit 201 is capable of setting a re-coding prohibition marker by which the target slice will not be re-coded.

Thus, so as to prohibit the re-coding processing on a slice which includes a face region or a focus region, the re-coding information generation unit 201 may set a re-coding prohibition marker that is included in the prohibition information. With this, the slice specifying unit 202 specifies a re-coding target slice among the slices for which the re-coding processing is not prohibited in the prohibition information, that is, the slices for which no re-coding prohibition markers have been set.

Although the face region and the focus region have been described as particular conditions of an image region, the evaluation may be conducted according to an image feature, that is, a low frequency region or a high frequency region based on an image frequency, for example, to determine the priority.

The re-coding information generation unit 201 determines, as the re-coding priority 411 of the A slice, the re-coding priority set as above (S214). Furthermore, the re-coding information generation unit 201 determines, as the dummy-creation priority 412 of the A slice, the dummy-creation priority set as above (S215). The re-coding information generation unit 201 generates information of these priorities in form of, for example, the re-coding information as shown in FIG. 5.

Furthermore, the re-coding information generation unit 201 determines whether or not there is a priority setting (S216). When the re-coding priority or the dummy-creation priority has been set (Yes in S216), the re-coding information generation 201 evaluates a difference between the code amount of the A slice and the target code amount (S217). When the difference is large ("Large" in S217), the re-coding information generation unit 201 determines reference YC as the coding input information 431 (S218). When the difference is small ("Small" in S217), the re-coding information generation unit 201 determines normal YC as the coding input information 431 (S219).

In the above-described manner, the re-coding information generation unit 201 generates, based on the slice state management table and the image feature information, the re-coding information which includes the re-coding priority, the dummy-creation priority, the re-coding prohibition marker, and the coding input information.

A process which is performed to select a re-coding slice for re-coding is described below with a specific example. For example, a picture 500 including 10 slices of slice_1 to slice_10 as shown in FIG. 8 is given as an example for the description.

Figure 8:
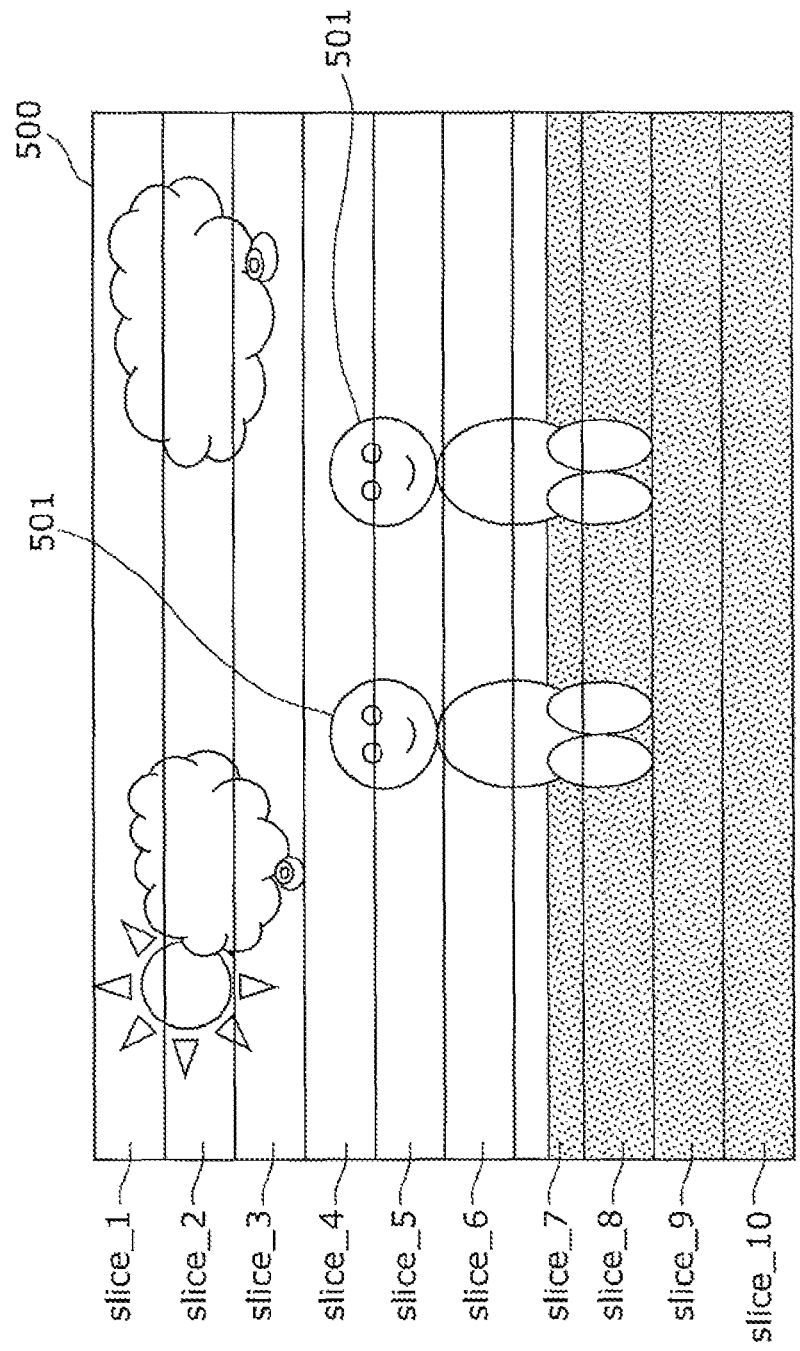
FIG. 8 shows an example of a current picture.

As shown in FIG. 8, slice_4 and slice_5 include a face region 501. The face region 501 is generally considered to be important for a user and therefore is a region where a reduction in the code amount is desired to be avoided. Accordingly, in the case of conducting an evaluation of re-coding of a slice, the re-coding information generation unit 201 lowers the re-coding priority 411 or sets the re-coding prohibition marker 421 for slice_4 and slice_5.

Figure 9:
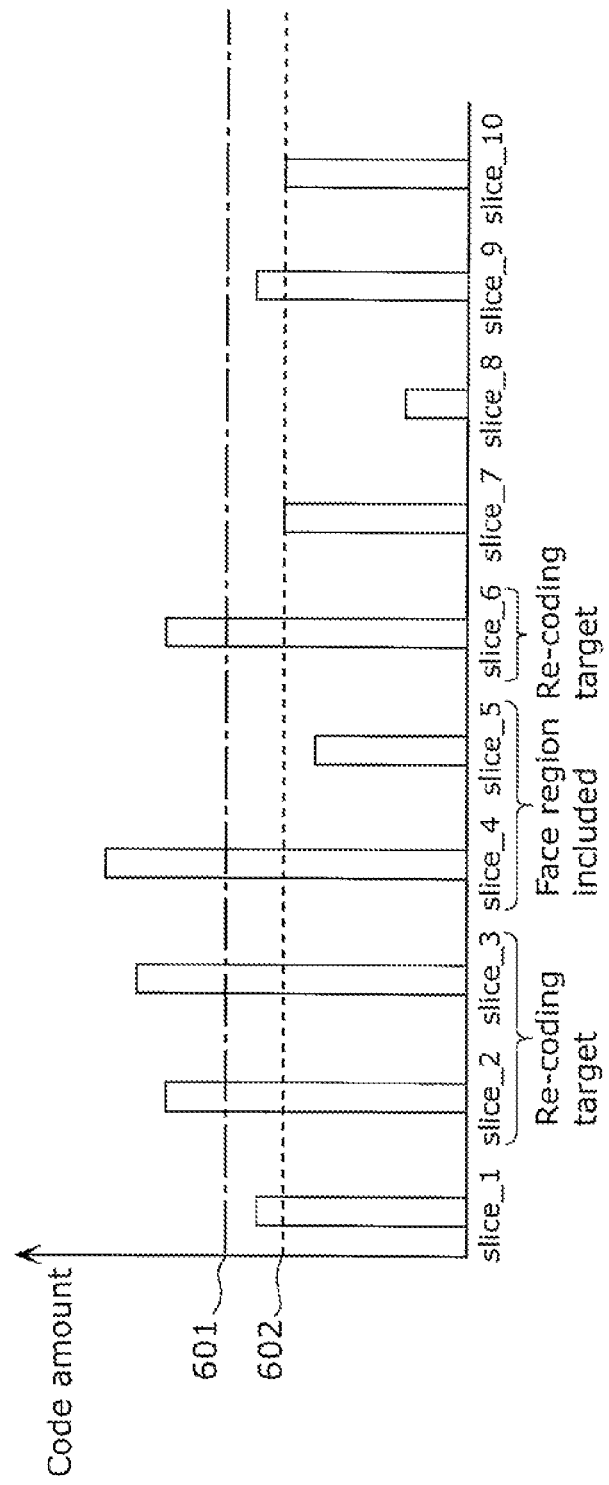
FIG. 9 is a graph showing a code amount of each slice of coded data generated by coding the current picture.

FIG. 9 is a graph showing the code amount of each slice of coded data generated by coding the picture 500 shown in FIG. 8. For the picture 500, code amounts to be achieved have been set, and the mean value of code amounts of the slices included in the picture 500 needs to be below the mean value of the code amounts to be achieved by the picture 500.

In FIG. 9, the actual code amounts of the slices from slice_1 to slice_10 are as represented by bar graphs. A dashed-dotted line represents a mean code amount 601 of the slices included in the picture 500. A dotted line represents a per-slice target mean code amount 602 of the code amounts to be achieved by the picture 500.

As shown in FIG. 9, the mean code amount 601 of the slices included in the picture 500 is above the per-slice target mean code amount 602 of the code amounts to be achieved by the picture 500. This means that the coded data generated by coding the picture 500 has a code amount over the code amount to be achieved, that is, there is overflow of the code amount in the coded data. Thus, the picture 500 is a picture which has overflow of the code amount, and therefore requires re-coding to reduce the code amount to the code amount which is to be achieved by the picture.

As shown in FIG. 9, the slice specifying unit 202 sets the per-slice mean code amount 601 of the picture 500 as a threshold for determining whether or not re-coding is to be performed. Thus, the slice specifying unit 202 determines that re-coding is to be performed on a slice which has a code amount over the threshold, that is, the per-slice mean code amount 601. In FIG. 9, slice_2, slice_3, slice_4, and slice_6 are targets of re-coding.

However, with reference to the image feature information, the re-coding information generation unit 201 can determine that slice_4 includes the face region 501 as shown in FIG. 8. As described above, the slice which includes a face region is considered to be a region where the code amount is not desired to be reduced.

Accordingly, in the case where a slice includes a face region, the re-coding information generation unit 201 can exclude the slice from the targets of re-coding by setting the re-coding prohibition marker. Furthermore, the re-coding information generation unit 201 can also lower the rank of slice_4 in the priority order of re-coding, by setting the re-coding priority of slice_4 to be lower than the re-coding priorities of slice_2, slice_3, and slice_6.

Thus, with reference to the image feature information, the re-coding information generation unit 201 is capable of setting a priority for determining a slice which becomes a target of re-coding, in view of whether or not the slice includes a face region. Here, in the case where a face region is included, re-coding is prohibited by setting the re-coding prohibition marker, and the slice specifying unit 202 determines slice_2, slice_3, and slice_6 as the re-coding target slices.

Figure 10:
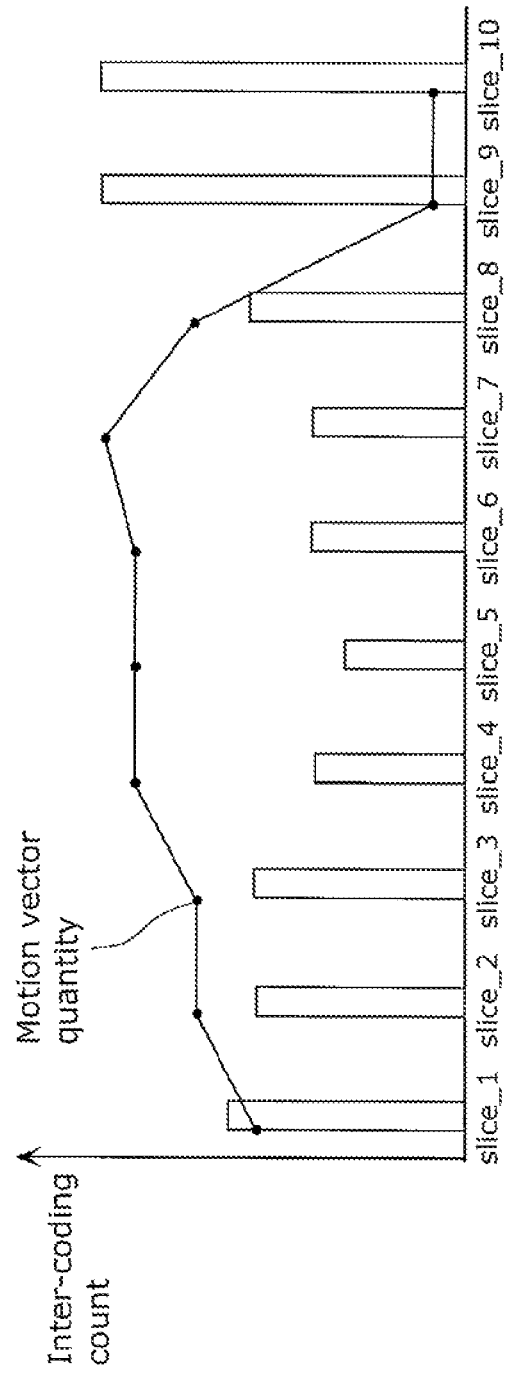
FIG. 10 is a graph showing per slice of the current picture the number of macroblocks which have motion vector quantity and the number of inter-coded macroblocks.

FIG. 10 is a graph showing per slice if the current picture the number of macroblocks which have motion vector quantity and the number of inter-coded macroblocks. A line plot represents the number of macroblocks having motion vector quantity. A bar graph represents the number of inter-coded macroblocks.

A slice which has a small number of macroblocks having motion vector quantity, a slice which has a large number of inter-coded macroblocks, or a slice which meets these conditions is a slice which has a strong correlation with a preceding slice and has little motion. Thus, such slice is a slice for which information on a preceding picture can be used directly, that is, a slice which is not considered to cause image-quality degradation even when a dummy slice is used (hereinafter referred to as dummy-creation-possible slice).

In the example shown in FIG. 10, slice_9 and slice_10 are dummy-creation-possible slices. The re-coding information generation unit 201 therefore selects slice_9 and slice_10 as targets of dummy creation, that is, sets the dummy-creation priorities for slice_9 and slice_10 high.

As above, the re-coding information generation unit 201 sets the dummy-creation priority high when the current slice is a dummy-creation-possible slice. Specifically, with reference to the slice state management table, the re-coding information generation unit 201 sets high the dummy-creation priority of a slice which corresponds to the slice state management table where the inter-coding count larger than a predetermined threshold has been stored. Furthermore, the re-coding information generation unit 201 sets high the dummy-creation priority of a slice which corresponds to the slice state management table where the maximum value of motion vector smaller than a predetermined threshold has been stored.

Alternatively, the re-coding information generation unit 201 may set, to the maximum value, the dummy-creation priority of a slice which corresponds to the slice state management table where the inter-coding count larger than a predetermined threshold and the maximum value of motion vector smaller than a predetermined threshold have been stored. By so doing, preferential dummy creation for a slice which has little motion and has a strong correlation with a preceding slice allows a reduction in the image-quality degradation and at the same time, allows a significant reduction in the code amount.

It is to be noted that the above process of setting the dummy-creation priority is performed, for example, in the process of determining re-coding conditions (S103) in the flowchart shown in FIG. 6. More specifically, the above process is performed before the determination of a dummy-creation priority (S215) in the flowchart shown in FIG. 7. For example, the above process is performed after the determination of a focus region (S212 and S213).

Figure 11:
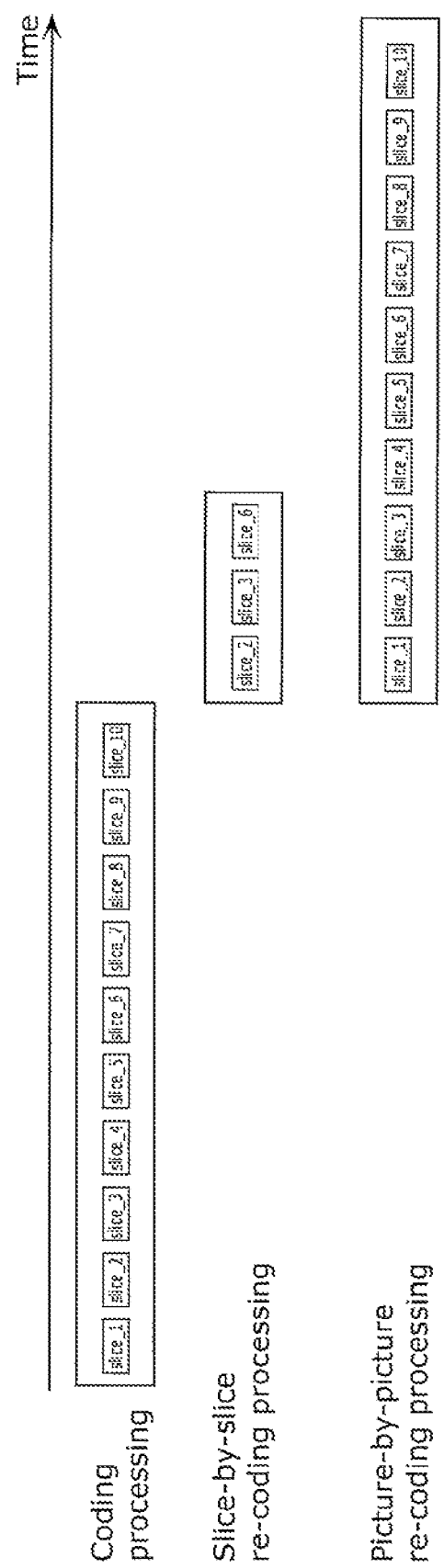
FIG. 11 shows time required for slice-by-slice re-coding processing and time required for picture-by-picture re-coding processing in the case where the current picture is coded and re-coded.

FIG. 11 shows time required for slice-by-slice re-coding processing and time required for picture-by-picture re-coding processing in the case where the current picture is coded and re-coded.

As shown in FIG. 11, re-coding is performed after coding of one picture is completed. The video signal coding apparatus 10 according to this embodiment specifies a slice which is to be re-coded, with reference to a coding result of one picture. Thus, the re-coding processing is always performed after an end of coding, which means that re-coding in parallel with coding is not performed.

Furthermore, the processing of dummy creation, which is different from the re-coding, is mere processing of changing a current slice into information that the current slice is a dummy slice. This therefore does not require processing time for re-coding.

Accordingly, in the slice-by-slice re-coding processing which the video signal coding apparatus 10 according to this embodiment performs, the coding processing unit 131 can produce a picture which meets the requirements of rate control, by performing only re-coding on the limited slices (slice_2, slice_3, and slice_6) as a result of comparison using the example shown in FIGS. 8 to 10. The slice-by-slice re-coding processing therefore takes shorter time than the picture-by-picture re-coding processing to complete the re-coding.

Subsequently, the adjustment of a compression rate in re-coding of the re-coding target slice (S107 in the drawings) is described. Specifically, the processing of adjusting a quantization parameter by the re-coding request unit 203 as described above is described.

When the quantization width indicated by the quantization parameter for re-coding is set to be greater than the quantization width indicated by the quantization parameter used in the first coding, the code amount of the current slice can be reduced. However, in the case where the difference is great between the quantization widths indicated by the respective quantization parameters for adjacent slices, a difference in the code amount between the slices will be noticeable, which lowers the degree of perfection of an image. For the re-coding target slice, a limitation is therefore set on the amount of change from the quantization parameter or compression rate for an adjacent slice so that a change of more than or equal to a certain amount will not appear.

Here, re-coding is performed on slice_2, slice_3, and slice_6.

Figure 12:
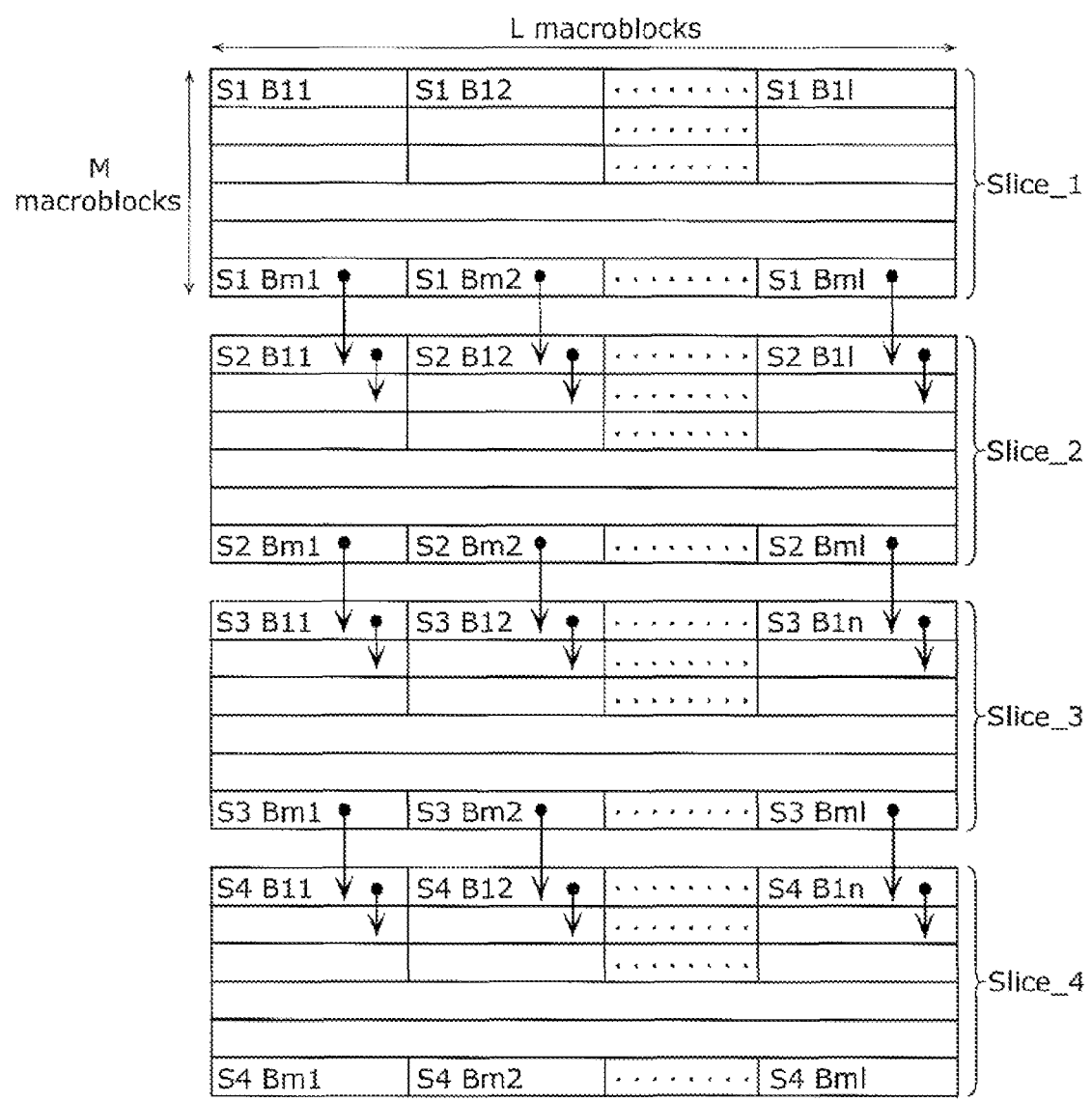
FIG. 12 is a view for explaining the adjustment of a quantization parameter according to the embodiment of the present invention.

FIG. 12 is a view for explaining the adjustment of a quantization parameter according to the embodiment of the present invention.

Assume that one slice includes L by M macroblocks where L and M are given natural numbers. In the example shown in FIG. 12, one slice includes L macroblocks in the horizontal direction by M macroblocks in the vertical direction. It is to be noted that among the macroblocks included in slice_K where K is a given natural number, a macroblock located the m-th from top and the 1-th from left is denoted by sK_Bml.

Slice_2 to be re-coded is adjacent to slice_1 and slice_3. In this case, it is assumed that slice_1 is not a target of re-coding and slice_3 is a target of re-coding.

The re-coding control unit 135 determines that slice_2 is a slice to be re-coded, and outputs a re-coding request to the re-coding processing unit 131. At this time, the re-coding request unit 203 determines a target code amount for the slice, that is, a per-slice achievement code amount, based on the target code amount of re-coding calculated by the coding result determination unit 133, and then requests re-coding based on the determined per-slice achievement code amount. Specifically, the re-coding request unit 203 determines a target code amount change rate that is a rate of difference between the present code amount of the current slice (which is slice_2 in this case) and the achievement code amount of the current slice.

The target code amount change rate per slice is determined based on a slice target difference rate and a code amount reduction rate of the current picture. The slice target difference rate is a rate of difference between the slice code amount before re-coding and the target mean value of code amounts. The code amount reduction rate of the current picture is a rate which indicates by how much code amount of a picture to be generated by re-coding needs to be lower than the code amount of the present picture.

For example, the target code amount change rate R is calculated by P×Q where P represents the code amount reduction rate and Q represents the slice target difference rate. It is to be noted that the target code amount change rate R is an example and the coding result determination unit 133 may use any calculation method as long as the code amount of a re-coded picture can be below the achievement code amount in the calculation method.

The current slice after re-coding needs to have a code amount reduced at the target code amount change rate R or a higher rate.

Here, the case of re-coding slice_2 is described. Assume that the target code amount change rate for slice_2 is R_S2. The change amount between the code amounts, which depends on the change amount between the quantization parameters, is assumed to be known.

The quantization parameter for coding slice_2 is set at the time of coding and can therefore be obtained from the information, which makes the quantization parameter known. Furthermore, since the change amount between the code amounts, which depends on the change amount between the quantization parameters, is known, it is possible to calculate a value of the quantization parameter for re-coding slice_2 with which the target code amount change rate R_S2 can be achieved.

Here, slice_2 is adjacent to slice_1. In the case where the difference is large between the quantization parameters for the adjacent macroblocks which are located one in slice_1 and the other in slice_2, for example, S1_Bm1 and S2B11, a difference in compression rate between the slices becomes noticeable, which is desired to be avoided. It is therefore desired that a slice-to-slice difference in the change amount between the quantization parameters be below a certain amount as described above.

Accordingly, in the case where the difference is large between the calculated value of the quantization parameter for re-coding and the value of the quantization parameter for a macroblock in an adjacent slice, the re-coding request unit 203 changes, based on the per-slice achievement code amount, the quantization parameter for each of the macroblocks of the slice to be re-coded. This makes it possible to provide a linear change between the slices and thereby avoid noticeable emergence, in a re-coded picture, of slice-to-slice and macroblock-to-macroblock differences caused due to differences in the compression rate. It is to be noted that the quantization parameter can be changed per middle-size region composed of a plurality of macroblocks.

Furthermore, in the case where the slices to be re-coded are adjacent to each other, quantization parameters are determined per the adjacent slices and macroblocks or per middle-size region composed of a plurality of macroblocks, using the quantization parameters for re-coding the adjacent slices, so that quantization parameters for re-coding are set in view of continuity of the re-coding target slices.

This allows a reduction in noise which is generated in a re-coded picture due to variation in the compression rate.

Figure 13:
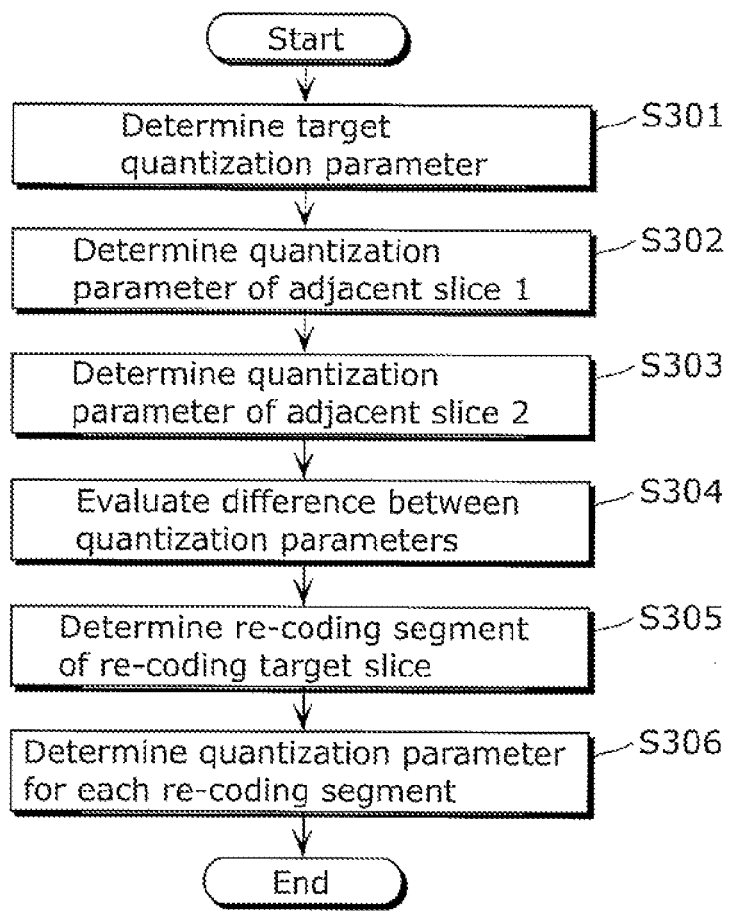
FIG. 13 is a flowchart showing an example of adjustment processing for the quantization parameter according to the embodiment of the present invention.

FIG. 13 is a flowchart showing an example of adjustment processing for the quantization parameter which is used to re-code a slice.

Here, with respect to a slice, an adjacent slice on top is an adjacent slice 1, and an adjacent slice below is an adjacent slice 2. The slice on which the re-coding is to be performed is referred to as an interest slice.

First, the re-coding request unit 203 determines a target quantization parameter for use in re-coding of the interest slice (S301).

Next, the re-coding request unit 203 determines a quantization parameter for the adjacent slice 1 (S302). Specifically, the re-coding request unit 203 determines whether or not the adjacent slice 1 of the interest slice is a re-coding target slice. For example, whether or not the adjacent slice 1 is a re-coding target slice can be determined based on whether or not the re-coding priority or the dummy priority has been set for the adjacent slice 1.

When the adjacent slice 1 is a re-coding target slice, a target quantization parameter for use in re-coding of the adjacent slice 1 is determined as a quantization parameter for the adjacent slice 1. When the adjacent slice 1 is not a re-coding target slice, a quantization parameter used to code the adjacent slice 1 is determined as a quantization parameter for the adjacent slice 1.

Next, the re-coding request unit 203 determines a quantization parameter for the adjacent slice 2 (S303). Specifically, the re-coding request unit 203 determines a quantization parameter for the adjacent slice 2 in the same or like manner as in determining the quantization parameter for the adjacent slice 1.

Subsequently, the re-coding request unit 203 calculates a difference between the target quantization parameter for use in re-coding of the interest slice and each of the quantization parameters for the adjacent slices 1 and 2, and then evaluates the calculated difference (S304).

When the difference between the quantization parameter for the adjacent slice 1 or 2 and the quantization parameter for the interest slice is large, it is likely that re-coding of the interest slice causes an increase in the compression rate of the interest slice and thereby makes slice-to-slice noise noticeable. When the difference between the quantization parameter for the adjacent slice 1 or 2 and the quantization parameter for the interest slice is small, the impact of slice-to-slice noise is small.

The re-coding request unit 203 checks a result of the evaluation on a difference between the quantization parameter for the adjacent slice 1 or 2 and the quantization parameter for the interest slice, to determine for which segment the re-coding is to be performed (S305). For example, when the difference between the quantization parameters for adjacent slices is large, the re-coding request unit 203 sets a quantization parameter for each macroblock, to reduce the difference between the quantization parameters for the adjacent macroblocks, which can absorb the difference in compression rate which occurs due to re-coding. When the difference between the quantization parameters for adjacent slices is small, the re-coding request unit 203 sets a quantization parameter for each middle-size region composed of a plurality of macroblocks, which can reduce an amount of processing in re-coding.

The re-coding request unit 203 then determines a value of the quantization parameter according to the determined re-coding segment (S306). For example, when the quantization parameter is changed per macroblock, the re-coding request unit 203 determines a quantization parameter for each macroblock. When the re-coding is performed per middle-size region composed of a plurality of macroblocks, the re-coding request unit 203 determines a per-middle-size-region quantization parameter. Alternatively, when the re-coding is performed per slice, the re-coding request unit 203 determines a per-slice quantization parameter for re-coding.

It is to be noted that when the quantization parameter is changed per macroblock, the re-coding request unit 203 refers to the value of the quantization parameter for an adjacent macroblock and thereby sets the target quantization parameter as a reference so that a difference in value between the quantization parameter for the adjacent macroblock and the target quantization parameter is within an amount of difference that is a predetermined threshold. When the quantization parameter is changed per middle-size region composed of a plurality of macroblocks, the re-coding request unit 203 refers to the value of the quantization parameter for each of the adjacent middle-size regions and thereby sets the target quantization parameter as a reference so that a difference in value between the quantization parameter for the adjacent middle-size region and the target quantization parameter is within a predetermined amount of difference.

Alternatively, when the re-coding is performed per slice, the re-coding request unit 203 sets the target quantization parameter.

As above, when the re-coding target slice (the interest slice) is re-coded, the re-coding request unit 203 determines a compression rate such that a difference between the compression rate and the compression rate used to code or re-code a slice adjacent to the re-coding target slice is smaller than or equal to a predetermined second threshold. The re-coding request unit 203 then controls the coding processing unit 131 by outputting, to the coding processing unit 131, the re-coding request which requests re-coding of the re-coding target slice at the determined compression rate.

By so doing, a difference in compression rate between the re-coding target slice and the adjacent slice can be prevented from becoming large, with the result that slice-to-slice noise can be reduced.

Although the video signal coding apparatus and the vide signal coding method according to the present invention have been described based on the embodiment, the present invention is not limited to such embodiment. Without departing from the scope of the present invention, the present invention includes an embodiment with some modifications on such embodiment, which are conceived by a person skilled in the art.

In addition, the present invention can not only be implemented as the video signal coding apparatus and the video signal coding method as described above, but also be implemented as a program which causes a computer to execute the video signal coding method according to an embodiment of the present invention. Furthermore, the present invention may be implemented as a computer-readable recording medium on which the above program is recorded, such as compact disc read only memory (CD-ROM). Moreover, the present invention may be implemented as information, data, or signals which indicate the above program. In addition, these program, information, data, and signals may be distributed via a communication network such as the Internet.

Furthermore, part or all of the constituents included in the video signal coding apparatus may be provided in one system large scale integration (LSI). The system LSI is a super multifunctional LSI manufactured by integrating plural components into one chip and is specifically a computer system which includes a microprocessor, a read only memory (ROM), a random access memory (RAM) and so on.

For instance, the example shown in FIGS. 1 and 2 in which the video signal generation unit 120 and the coding unit 130 are included in the semiconductor integrated circuit 100 has been described, but it may be possible that only the coding unit 130 is included in the semiconductor integrated circuit.

Although only an exemplary embodiment of the present invention has been described in detail above, those skilled in the art will readily appreciate that many modifications are possible in the exemplary embodiment without materially departing from the novel teachings and advantages of the present invention. Accordingly, all such modifications are intended to be included within the scope of the present invention.

INDUSTRIAL APPLICABILITY

The video signal coding apparatus and the video signal coding method according to the present invention can be used, for example, for cameras or digital recorders which code video signals, and more specifically for surveillance cameras, network cameras such as WEB cameras, automobile cameras such as on-vehicle cameras and drive recorders, and so on.

The invention claimed is:

1. A video signal coding apparatus comprising:
an imaging device which generates an electric signal by performing photoelectric conversion of light from a subject;
a video signal generation unit configured to generate a video signal by performing predetermined image processing on the electric signal generated by the imaging device; and
a coding unit configured to code the video signal,
wherein the coding unit includes:
a coding processing unit configured to code, slice-by-slice, a current picture indicated by the video signal, to generate coded data;
a coding information management unit configured to manage, slice-by-slice, coding information indicating a feature of the coded data;
an integration unit configured to integrate per-slice code amounts of the coded data equivalent to one current picture, to calculate a code-integrated value indicating a code amount of the coded data equivalent to one picture;
a coding result determination unit configured to determine whether or not the code-integrated value is greater than a predetermined first threshold, and determine that re-coding processing on the current picture is necessary when determining that the code-integrated value is greater than the first threshold; and
a re-coding control unit configured to specify a re-coding target slice based on the coding information when the coding result determination unit determines that the re-coding processing is necessary, the re-coding target slice being a target of the re-coding processing, and
the coding processing unit is further configured to perform the re-coding processing on the re-coding target slice specified by the re-coding control unit.

2. The video signal coding apparatus according to claim 1, wherein the video signal generation unit is further configured to parse the video signal to generate image feature information indicating a feature of the video signal, and
the re-coding control unit is configured to specify the re-coding target slice based on at least one of the coding information and the image feature information when it is determined that the re-coding processing is necessary.

3. The video signal coding apparatus according to claim 2, wherein the re-coding control unit includes:
a re-coding information generation unit configured to generate re-coding information slice-by-slice based on at least one of the coding information and the image feature information, the re-coding information including priority information indicating a priority of the re-coding processing;
a slice specifying unit configured to specify, based on the re-coding information, the re-coding target slice from among one or more slices included in the current picture; and
a re-coding request unit configured to control the coding processing unit so that the coding processing unit performs the re-coding processing on the re-coding target slice specified by the slice specifying unit.

4. The video signal coding apparatus according to claim 3, wherein the re-coding processing includes re-coding of a slice and creation of a dummy for a slice,
the re-coding information generation unit is configured to generate the priority information which indicates at least one of a re-coding priority indicating a priority of the re-coding of a slice and a dummy-creation priority indicating a priority of the creation of a dummy for a slice, and the re-coding request unit is configured to control the coding processing unit so that when the re-coding priority of a slice specified by the slice specifying unit is higher than the dummy-creation priority of the slice, the coding processing unit re-codes the slice and when the re-coding priority of the slice is lower than the dummy-creation priority of the slice, the coding processing unit creates a dummy for the slice.

5. The video signal coding apparatus according to claim 4, wherein the slice specifying unit is configured to preferentially specify, as the re-coding target slice, a slice ranked high in the re-coding priority or the dummy-creation priority.

6. The video signal coding apparatus according to claim 4, wherein when the re-coding target slice is re-coded, the re-coding request unit is configured to (i) determine a compression rate of the re-coding target slice such that a difference between the compression rate and a compression rate used to code or re-code a slice adjacent to the re-coding target slice is smaller than or equal to a predetermined second threshold and (ii) control the coding processing unit so that the coding processing unit re-codes the re-coding target slice at the determined compression rate.

7. The video signal coding apparatus according to claim 6, wherein the re-coding request unit is configured to determine the compression rate of the re-coding target slice macroblock-by-macroblock, the macroblock including one or more macroblocks included in the re-coding target slice.

8. The video signal coding apparatus according to claim 3, wherein the re-coding information generation unit is configured to generate, based on at least one of the coding information and the image feature information, the re-coding information which includes prohibition information indicating whether or not to prohibit the re-coding processing on the one or more slices included in the current picture, and the slice specifying unit is configured to specify the re-coding target slice from among slices of which the re-coding processing is indicated by the prohibition information as not being prohibited.

9. The video signal coding apparatus according to claim 8, wherein the video signal generation unit is configured to parse the video signal to generate, as the image feature information, information indicating at least one of a face region in which an image of a human face is included and a focus region in which a focus is placed in capturing an image, and the re-coding information generation unit is configured to set the prohibition information so as to prohibit the re-coding processing on a slice which includes the face region or the focus region.

10. The video signal coding apparatus according to claim 3, wherein the re-coding control unit further includes a re-coding end determination unit configured to determine whether or not a code amount of the current picture after the re-coding processing is greater than the first threshold, and the slice specifying unit is further configured to specify the re-coding target slice from among the one or more slices included in the current picture when the re-coding end determination unit determines that the code amount of the current picture after the re-coding processing is greater than the first threshold.

11. The video signal coding apparatus according to claim 10, wherein the re-coding end determination unit is configured to determine, every time the re-coding processing on the re-coding target slice specified by the slice specifying unit ends, whether or not the code amount of the current picture after the re-coding processing is greater than the first threshold, and the slice specifying unit is configured to specify the re-coding target slice until the re-coding end determination unit determines that the code amount of the current picture after the re-coding processing is less than the first threshold.

12. The video signal coding apparatus according to claim 4, wherein the re-coding information generation unit is configured to determine whether or not a difference between the code-integrated value and the first threshold is greater than a predetermined third threshold, and generate the re-coding information which, when determining that the difference is greater than the third threshold, indicates a reference image that is generated in coding, and when determining that the difference is smaller than the third threshold, indicates coding input information indicating an input image included in the video signal, and the re-coding request unit is configured to control the coding processing unit so that the coding processing unit selects, as the target of the re-coding processing, an image indicated by the coding input information.

13. The video signal coding apparatus according to claim 1, wherein the coding information management unit is configured to evaluate the coded data slice-by-slice or macroblock-by-macroblock to generate, slice-by-slice, a slice state management table as the coding information, the macroblock being included in the slice, and the slice state management table indicating a feature of a current slice that is coded and included in the coded data, or a feature of one or more macroblocks included in the current slice.

14. A video signal coding method comprising:
coding, slice-by-slice, a current picture indicated by a video signal, to generate coded data;
integrating per-slice code amounts of the coded data equivalent to one current picture, to calculate a code-integrated value indicating a code amount of the coded data equivalent to one picture;
determining whether or not the code-integrated value is greater than a predetermined threshold, and determining that re-coding processing on the current picture is necessary when determining that the code-integrated value is greater than the threshold;
specifying a re-coding target slice based on coding information when it is determined in the determining that the re-coding processing is necessary, the re-coding target slice being a target of the re-coding processing, and the coding information indicating a feature of the coded data; and
performing the re-coding processing on the re-coding target slice specified in the specifying.

15. An integrated circuit which codes a current picture indicated by a video signal, the integrated circuit comprising:
a coding processing unit which codes the current picture slice-by-slice to generate coded data;

a coding information management unit which manages, slice-by-slice, coding information indicating a feature of the coded data;

an integration unit which integrates per-slice code amounts of the coded data equivalent to one current picture, to calculate a code-integrated value indicating a code amount of the coded data equivalent to one picture;

a coding result determination unit which determines whether or not the code-integrated value is greater than a predetermined first threshold, and determines that re-coding processing on the current picture is necessary when determining that the code-integrated value is greater than the first threshold; and a re-coding control unit which specifies a re-coding target slice based on the coding information when the coding result determination unit determines that the re-coding processing is necessary, the re-coding target slice being a target of the re-coding processing, and the coding processing unit further performs the re-coding processing on the re-coding target slice specified by the re-coding control unit.

* * * * *